(12) United States Patent
Ogawara et al.

(10) Patent No.: US 10,991,342 B2
(45) Date of Patent: Apr. 27, 2021

(54) TERMINAL APPARATUS, SYSTEM, AND METHOD OF DISPLAYING IMAGE

(71) Applicants: Osamu Ogawara, Kanagawa (JP); Yohei Fujita, Kanagawa (JP); Takayuki Hara, Kanagawa (JP)

(72) Inventors: Osamu Ogawara, Kanagawa (JP); Yohei Fujita, Kanagawa (JP); Takayuki Hara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/449,572

(22) Filed: Jun. 24, 2019

(65) Prior Publication Data

US 2020/0013374 A1 Jan. 9, 2020

(30) Foreign Application Priority Data

Jul. 4, 2018 (JP) .............................. JP2018-127737
May 28, 2019 (JP) .............................. JP2019-099615

(51) Int. Cl.
*G06T 15/00* (2011.01)
*G09G 5/377* (2006.01)
*G06F 3/01* (2006.01)

(52) U.S. Cl.
CPC .............. *G09G 5/377* (2013.01); *G06F 3/013* (2013.01); *G06T 15/005* (2013.01); *G06T 2200/04* (2013.01); *G09G 2354/00* (2013.01)

(58) Field of Classification Search
CPC .... G06F 3/011; G06K 9/00671; G06T 19/006
USPC ........................................................ 345/633
See application file for complete search history.

(56) References Cited

U.S. PATENT DOCUMENTS

| 9,606,622 | B1* | 3/2017 | Brothers .................. G06F 3/013 |
| 2013/0083173 | A1* | 4/2013 | Geisner .................. G06F 3/1423 348/51 |
| 2015/0082145 | A1* | 3/2015 | Ames ...................... G06F 3/012 715/234 |
| 2015/0082180 | A1* | 3/2015 | Ames .................. G06F 3/04815 715/738 |
| 2015/0082181 | A1* | 3/2015 | Ames .................... G06F 3/0487 715/738 |
| 2018/0039856 | A1 | 2/2018 | Hara |
| 2018/0260646 | A1 | 9/2018 | Hara |
| 2018/0276722 | A1 | 9/2018 | Fujita et al. |

(Continued)

FOREIGN PATENT DOCUMENTS

| JP | 2008-192115 | 8/2008 |
| JP | 2018-160225 | 10/2018 |
| JP | 2019-022207 | 2/2019 |

*Primary Examiner* — Thomas J Lett
(74) *Attorney, Agent, or Firm* — Oblon, McClelland, Maier & Neustadt, L.L.P.

(57) ABSTRACT

A terminal apparatus includes circuitry configured to receive image data of an object and three-dimensional computer graphics (3DCG) data transmitted from an image distribution apparatus, and display, on a display, a specific region image corresponding to a specific region within an image of the object as a background image, and an image of the 3DCG data as a superimposed image to be superimposed on the background image. The specific region image corresponding to the specific region is generatable from the image data of the object and the image of the 3DCG data is generatable from the 3DCG data.

19 Claims, 27 Drawing Sheets

(56) References Cited

U.S. PATENT DOCUMENTS

2019/0028642 A1   1/2019  Fujita et al.
2019/0132521 A1   5/2019  Fujita et al.
2019/0253743 A1*  8/2019  Tanaka ............. H04N 21/21805

* cited by examiner

HEMISPHERICAL IMAGE (FRONT SIDE)

HEMISPHERICAL IMAGE (REAR SIDE)

CAPTURED IMAGE (MERCATOR IMAGE)

FIG. 7A
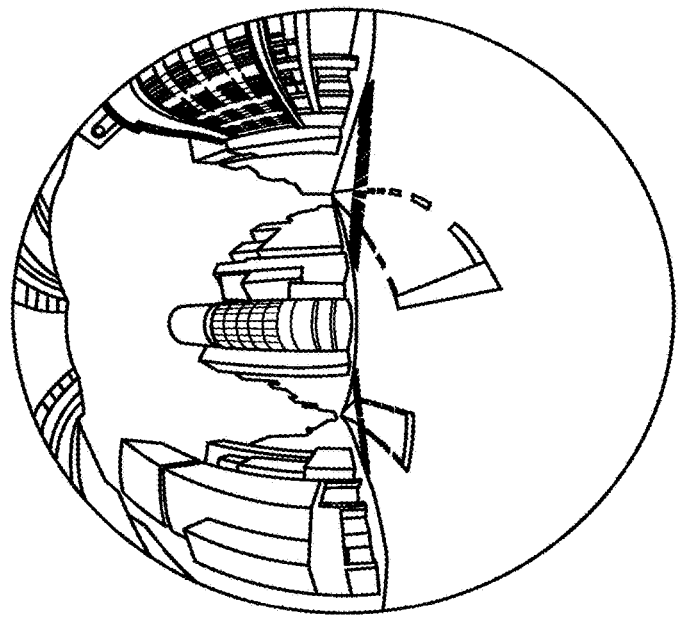
EQUIRECTANGULAR PROJECTION IMAGE EC
FIG. 7B
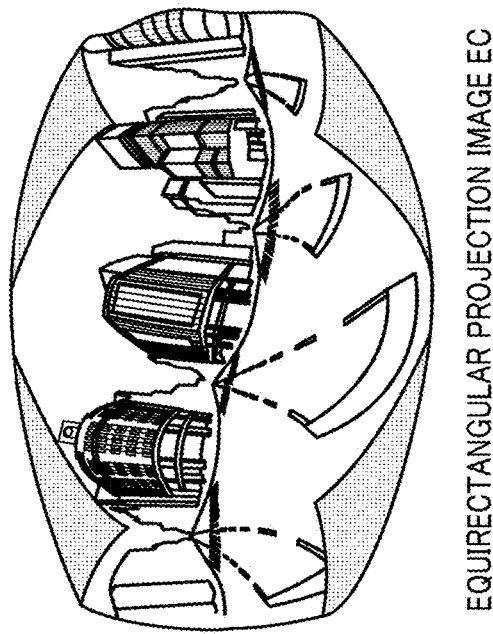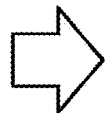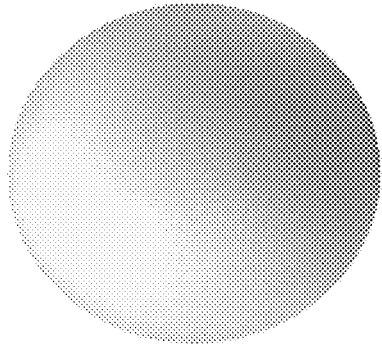
FULL-VIEW SPHERICAL IMAGE CE

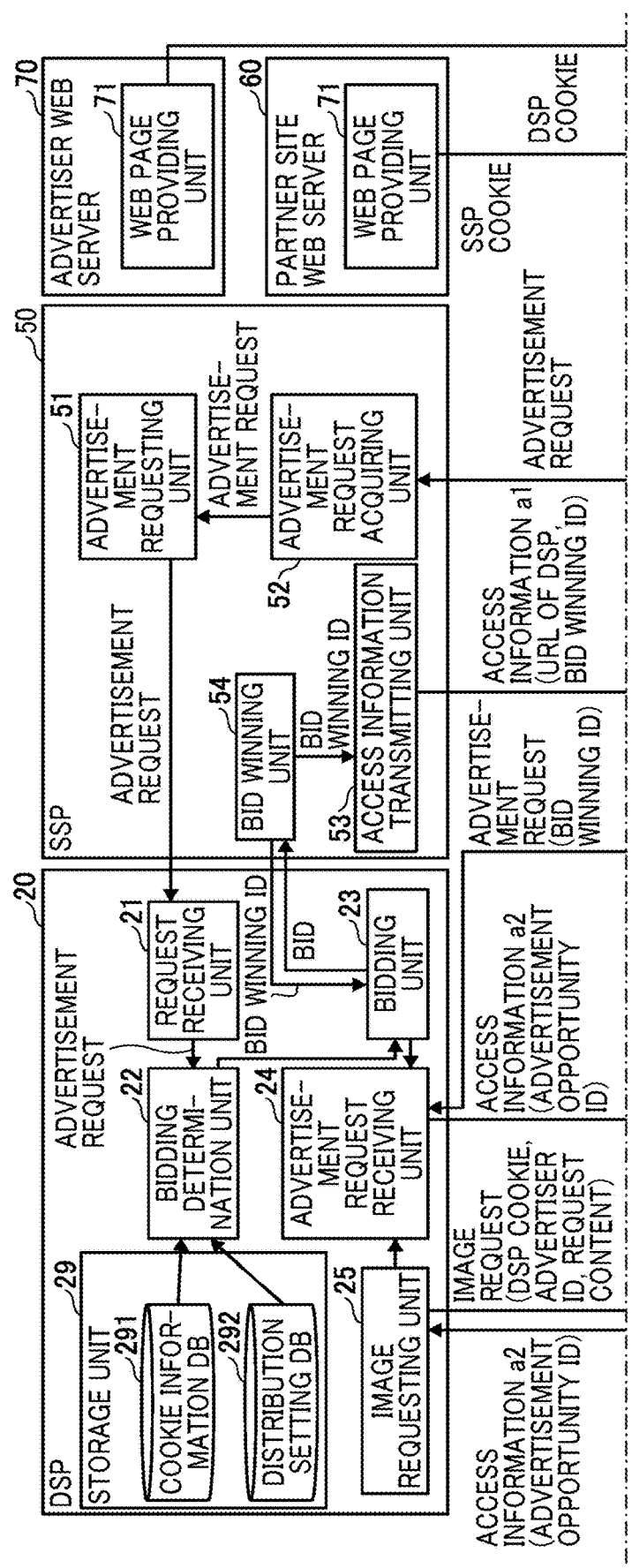

TERMINAL APPARATUS, SYSTEM, AND METHOD OF DISPLAYING IMAGE

CROSS-REFERENCE TO RELATED APPLICATION

This application claims priority pursuant to 35 U.S.C. § 119(a) to Japanese Patent Application Nos. 2018-127737, filed on Jul. 4, 2018 and 2019-099615, filed on May 28, 2019, in the Japan Patent Office, the disclosures of which are incorporated by reference herein in its entirety.

BACKGROUND

Technical Field

This disclosure relates to a terminal apparatus, a system, and a method of displaying an image.

Background Art

Advertisement distribution/display systems are used to display advertisements provided by advertisers on advertisement frames set on web pages. The advertisers can display the advertisement of products, such as goods and services, on the advertisement frames provided by various web sites. Viewer persons who are interested in the goods and services displayed on the advertisement frames click or tap the advertisement frames, with which the advertisers can invite the viewer persons to the web sites of the advertisers.

The advertisers want to increase the frequency of clicking of the advertisements by viewer persons. Since the number of advertisements posted on one web page has been increasing, the advertisers are devising methods that can attract interest of the viewer persons effectively. In one conventional technique, an advertisement effect (e.g., clicking rate) is increased by distributing movie images because the viewer persons tend to be attracted to moving objects such as the movie images because the viewer persons tend to be attracted to moving objects such as the movie images, the advertising can be more noticeable and the advertisement effect can be increased.

However, since a plurality of images consisting the movie image is being displayed sequentially one to another in time series, the movie image may not be displayed in a manner that can attract interest of the viewer persons, with which the clicking rate of images may not be improved.

SUMMARY

As one aspect of the present invention, A terminal apparatus includes circuitry configured to receive image data of an object and three-dimensional computer graphics (3DCG) data transmitted from an image distribution apparatus, and display, on a display, a specific region image corresponding to a specific region within an image of the object as a background image, and an image of the 3DCG data as a superimposed image to be superimposed on the background image, The specific region image corresponding to the specific region generatable from the image data of the object and the image of the 3DCG data generatable from the 3DCG data.

As another aspect of the present invention, a method of displaying an image is devised. The method includes receiving image data of an object and three-dimensional computer graphics (3DCG) data transmitted from an image distribution apparatus, and displaying, on a display, a specific region image corresponding to a specific region within an image of the object as a background image, and an image of the 3DCG data as a superimposed image to be superimposed on the background image, the specific region image corresponding to the specific region generatable from the image data of the object and the image of the 3DCG data generatable from the 3DCG data.

As another aspect of the present invention, a terminal apparatus is devised. The terminal apparatus includes circuitry configured to receive two-dimensional computer graphics (2DCG) data and three-dimensional computer graphics (3DCG) data transmitted from an image distribution apparatus, and display, on a display, a specific region image corresponding to a specific region within an image of the 2DCG data as a background image, and an image of the 3DCG data as a superimposed image to be superimposed on the background image, the specific region image corresponding to the specific region generatable from the 2DCG data and the image of the 3DCG data generatable from the 3DCG data.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIGS. 7A and 7B (FIG. 7) illustrate a scheme of generating a full-view spherical image from hemispherical images captured by a full-view spherical camera, according to an embodiment of the present disclosure;

FIGS. 9A and 9B (FIG. 9) are an example block diagrams illustrating a functional configuration of a terminal apparatus, an advertiser web server, a partner site web server, an image distribution apparatus, an SSP and a DSP of an embodiment, according to an embodiment of the present disclosure;

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of one or more embodiments of a browsing system, an image distribution method performed in the browsing system with reference to the drawings.

Electronic Apparatus System

Figure 1A:
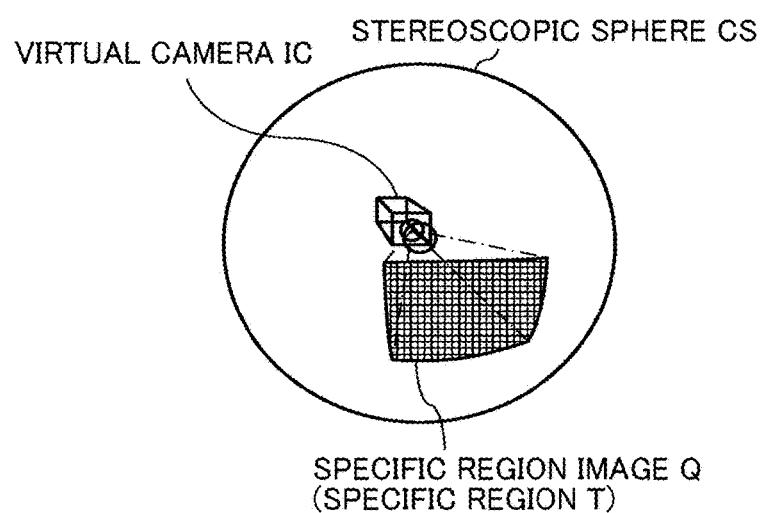
FIGS. 1A and 1B (FIG. 1) are example diagrams illustrating a wide-angle image, such as a full-view spherical image.
Figure 1B:
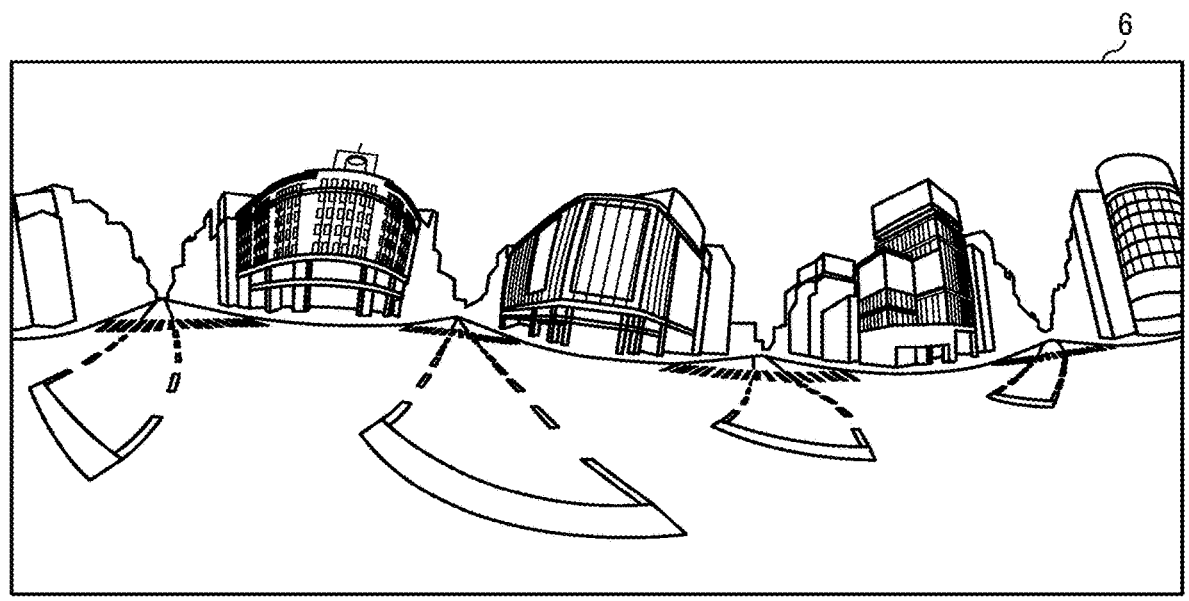

FIGS. 1A and 1B (FIG. 1) illustrate an example of a wide-angle image, such as a full-view spherical image 6. FIG. 1A illustrates an example of a spherical image expressed by a three-dimensional stereosphere CS, and FIG. 1B illustrates the full-view spherical image 6 expressed by Mercator projection Hereinafter, the full-view spherical image 6 is described as an example of equirectangular projection image. The full-view spherical image 6 generated by a full-view spherical camera has a three-dimensional structure that the equirectangular projection image illustrated in FIG. 1B is transferred on the stereosphere CS. In this configuration, a virtual camera IC corresponds to a virtual view point of a viewer person, and the virtual view point of the viewer person is set at the center of the full-view spherical image 6 in FIG. 1A. When the viewer person rotates the virtual camera IC about three axes such as X axis, Y axis and Z axis passing through the virtual camera IC, a specific region T in the full-view spherical image 6 can be displayed as a specific region image Q on a display of the terminal apparatus 30. Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the specific region.

Figure 2:
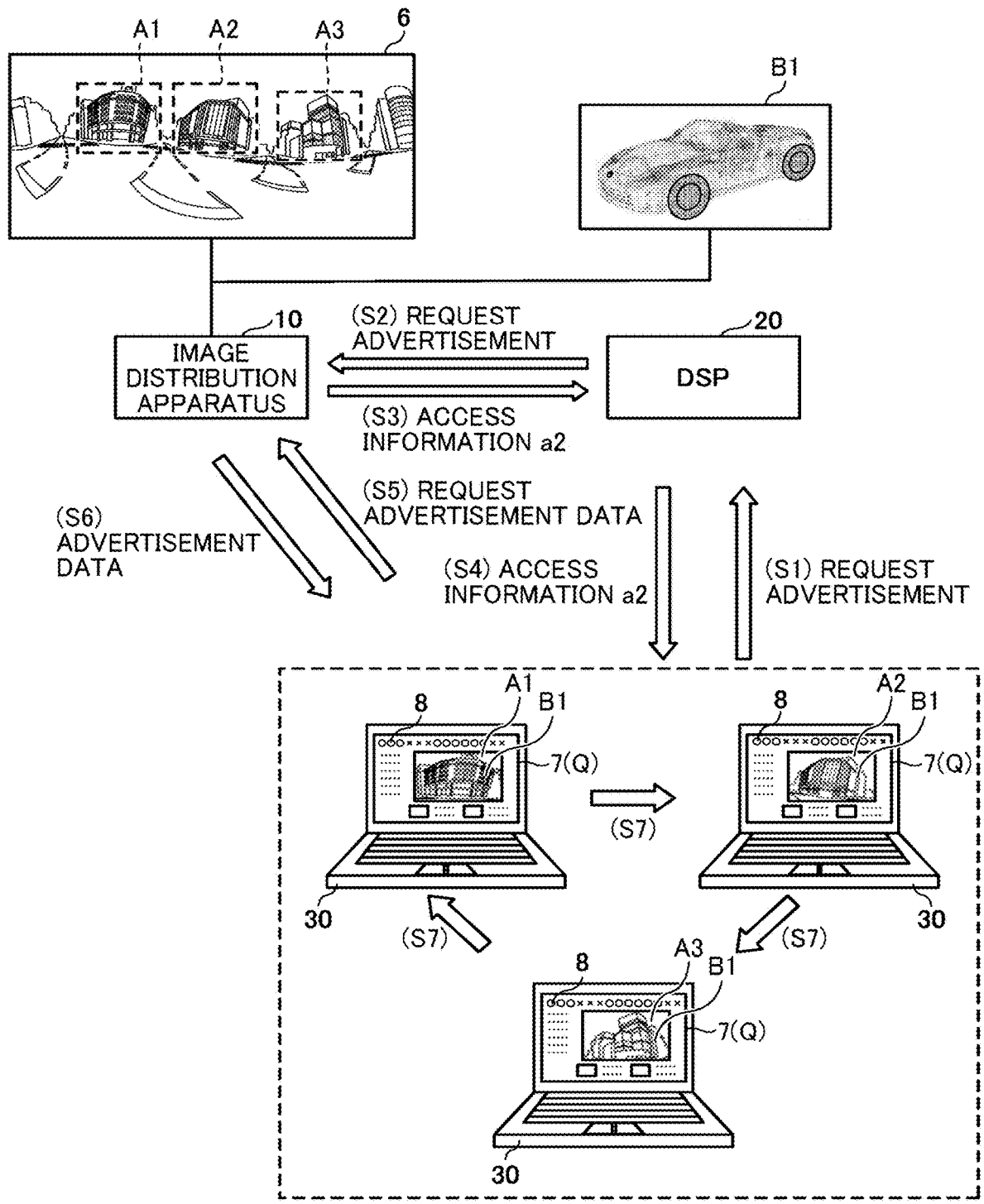
FIG. 2 illustrates a scheme of a browsing system, according to an embodiment of the present disclosure.

FIG. 2 illustrates a scheme of a browsing system 100 of the embodiment. Hereinafter, a description is given of the browsing system 100 that uses the full-view spherical image 6 as advertising materials distributed by a third-party distribution system. The third-party distribution system is designed to distribute advertisement materials across multiple media to manage the entire campaign at an advertiser side. In the third-party distribution system, a third-party distribution server controls the frequency of advertisement distribution, and measures an effect of advertisement. In an example case in FIG. 2, the image distribution apparatus 10 corresponds to the third-party distribution server. The browsing system 100 can be used as below.

(S1) When a terminal apparatus 30 opens a web page including an advertisement frame 7 using a browser 8, a demand-side platform (DSP) 20 that is designed to display advertisements on the terminal apparatus 30 is notified to the terminal apparatus 30. Then, the terminal apparatus 30 requests an advertisement to the DSP 20 by transmitting an advertisement request.

(S2) The DSP 20 requests the advertisement to the image distribution apparatus 10 by transmitting the advertisement request.

(S3) The image distribution apparatus 10 stores the advertisement request, generates access information a2 to be used by the terminal apparatus 30 to access the image distribution apparatus 10, and transmits the access information a2 to the DSP 20.

(S4) After the DSP 20 receives the access information a2, the DSP 20 transmits the access information a2 to the terminal apparatus 30.

(S5) The terminal apparatus 30 requests advertisement data, such as the full-view spherical image 6 and a three-dimensional computer graphics (3DCG) image, to the image distribution apparatus 10 based on the access information a2. In the embodiment, the image distribution apparatus 10 sets a plurality of gazing regions A (each gazing region is defined as "An" (n: natural number)) in the full-view spherical image 6, and maintains data of coordinates and data of angle of view specifying each gazing region "An." Hereinafter, the plurality of gazing regions A may be simply referred to as the gazing region A. Further, the image distribution apparatus 10 maintains data specifying a plurality of target gazing directions B of 3DCG (each target gazing direction is represented as "Bn" (n: natural number)) and data specifying a size of 3DCG data (e.g., pixel numbers of vertical direction and horizontal direction). Further, instead of the size data, data indicating enlargement rate and reduction rate can be used.

(S6) The image distribution apparatus 10 transmits the advertisement data to the terminal apparatus 30, wherein the advertisement data is requested from the terminal apparatus 30 based on the access information a2.

(S7) After the terminal apparatus 30 receives the advertisement data, the browser 8, operated on the terminal apparatus 30, displays a plurality of gazing regions A within the full-view spherical image 6 as a specific region image Q in accordance with a displaying sequence defined by region displaying sequence information. In an example case of FIG. 2, the full-view spherical image 6 includes three gazing regions A1, A2 and A3, and an angle of view set for each of three gazing regions A1, A2 and A3. The terminal apparatus 30 generates advertisement data using the full-view spherical image 6 that can be rotated along the displaying sequence of gazing region A1 (angle of view 1)→gazing region A2 (angle of view 2)→gazing region A3 (angle of view 3) even if a viewer person does not operate the full-view spherical image 6. Further, the browser 8 being operated on the terminal apparatus 30 is used to display an image of the 3DCG image data (e.g., "B1" in FIG. 2) in accordance with the displaying sequence (i.e., gazing target displaying sequence information) set for a plurality of gazing directions. In this case, the specific region image Q is displayed as a background image, and a superimposed image, such as 3DCG image, is superimposed over the background image and displayed.

In this configuration, the specific region T is specified by the gazing region A and the angle of view within the full-view spherical image 6. If the angle of view is the initial value, the condition of "gazing region A=specific region T" can be set. If the angle of view is set larger, the condition of "gazing region A> specific region T" is set, and the enlarged gazing region A is displayed on the display. On the other hand, if the angle of view is set smaller, the condition of "gazing region A <specific region T" is set, and the gazing region A reduced in the size is displayed on the display. That is, when the angle of view is set smaller, an image of the gazing region A and an image of periphery of the gazing region A are displayed on a display.

As to the browsing system 100 of the embodiment, the terminal apparatus 30 can automatically display the gazing regions corresponding to the feature portions in the full-view spherical image 6 and the target gazing direction of 3DCG image independently using a display style, such as a movie image style, and thereby the interest of viewer persons can be easily attracted. Further, since the image can be displayed as a zoom-in image (i.e., enlarged image) or a zoom-out image (i.e., reduction image) by changing the angle of view, the interest of the viewer persons can be further attracted easily. Typically, when the full-view spherical image is used as the advertisement, viewing the entire region of the advertisement is difficult. In the embodiment, the browsing system 100 can display one or more portions within the advertisement image (e.g., full-view spherical image) where the advertiser wants to emphasize, with which an effect of advertisement image can be enhanced, in which the effect of advertisement image, such as clicked rate or frequency of the advertisement image, can be enhanced.

The full-view spherical image is an example of an image captured by a full-view spherical imaging camera, which is an example of an image capture device. The captured image is not limited to the full-view spherical image, but can be a normal plane image. The effect of advertisement means at least viewer persons are attracted to the advertisement, but not limited thereto. For example, the effect of advertisement means clicking or tapping operations performed by the viewer persons.

The displaying sequence of the display regions is defined by the region displaying sequence information, and the advertisement display unit 40 in the terminal apparatus 30 to be described later displays the gazing regions in the advertisement frame 7 by changing the gazing regions and the angle of view of the gazing regions in the full-view spherical image 6 in accordance with the displaying sequence of the gazing regions defined by the region displaying sequence information. The size of gazing region, which is a part of the full-view spherical image can be set narrower to broader, and a plurality gazing regions, which are parts of the full-view spherical image 6, can be displayed using a displaying sequence used for sequentially displaying the center point of each of the plurality of display regions.

The displaying sequence of the gazing direction is defined by the gazing target displaying sequence information. The advertisement display unit 40 of the terminal apparatus 30, to be described later, displays the 3DCG image in the advertisement frame 7 by changing the gazing direction of the 3DCG image in accordance with the displaying sequence of the gazing direction defined by the gazing target displaying sequence information. In this description, the advertisement display unit 40 is an example of a display control unit.

System Configuration

Figure 3:
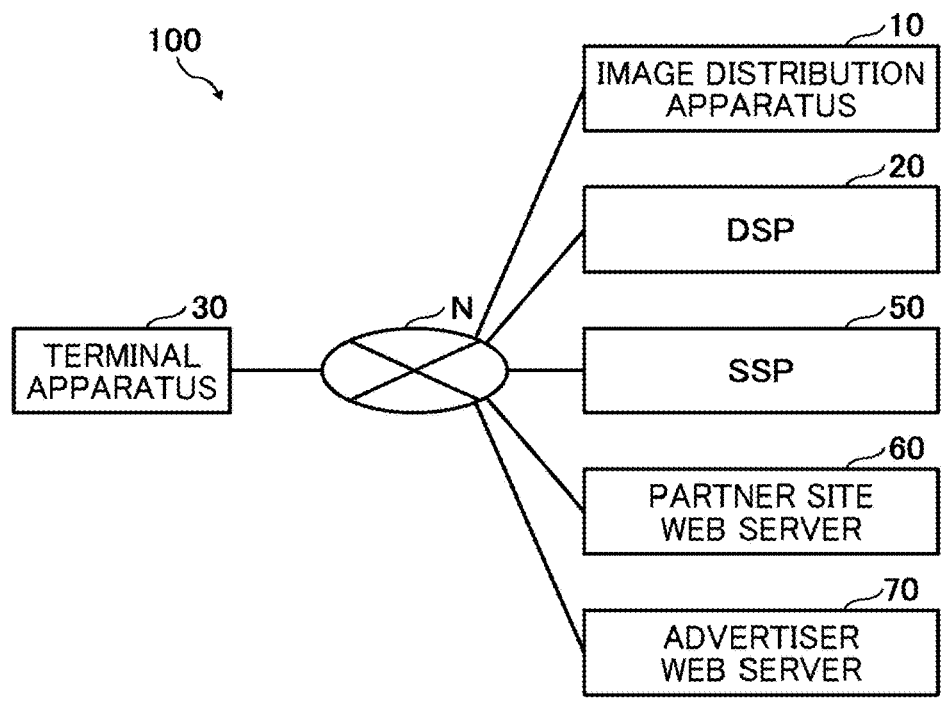
FIG. 3 schematically illustrates an example of a system configuration of a browsing system, according to an embodiment of the present disclosure.

FIG. 3 schematically illustrates an example of a system configuration of the browsing system 100. As illustrated in FIG. 3, the browsing system 100 includes, for example, the terminal apparatus 30, the image distribution apparatus 10, the DSP 20, a supply side platform (SSP) 50, a partner site web server 60, and an advertiser web server 70, communicably connected with each other via a network N.

The network N is constructed by a local area network (LAN), which is disposed in a location where the terminal apparatus 30 is disposed, a provider network of a provider used for connecting the LAN to the Internet, and a line provided by a line carrier. If the network N includes multiple LANs, the network N is referred to as a wide area network (WAN) or the Internet that connects computers and networks, for example, globally and interactively. The network N may be a wired network, a wireless network, or a combination of the both. Further, when the terminal apparatus 30 is directly connected to a public line network, the terminal apparatus 30 can be connected to a provider network without the LAN.

In this description, the terminal apparatus 30 is used as an information processing apparatus, which can be operated as a client terminal. In the terminal apparatus 30, a browser 8 or an application software having an equivalent function is operated, with which a web page requested by the terminal apparatus 30 is received from the partner site web server 60 and displayed on a display, such as liquid crystal display (LCD) to be described later.

The terminal apparatus 30 can be any apparatus that displays web pages, such as a personal computer (PC), a tablet device, a smart phone, a personal digital assistant (PDA), a game machine, a navigation terminal, and a wearable PC. For example, if a printer has a function of displaying web pages on a display, the printer can be used as the terminal apparatus 30. Further, a digital signage can be used to display web pages. The digital signage means a system or a display using an electronic display device such as a display panel used for displaying information at places or locations where people gather such as outdoors, shops, public spaces, and transportation facilities, and the digital signage may also mean information displayed on the display. In the embodiment, it is assumed that the web page includes one or more web applications. The web application is activated using a program described in a program language, such as JavaScript (registered trademark) on a web browser, and a program on a web browser cooperatively, and the web application indicates software or configuration used on the web browser.

The terminal apparatus 30 can be connected with the network N via an access point of a wired local area network (LAN) or a wireless LAN and can be connected to the network N by using communication standards of circuit switching type such as 3G, 4G and long-term evolution (LTE).

The partner site web server 60 is a server, which is a general information processing apparatus, that provides information and functions to a client computer used by a viewer person (e.g., terminal apparatus 30) through the network N. The advertiser web server 70 provides a web page including the advertisement frame 7. The web page means one or more web pages in this description. The partner site web server 60 requests the SSP 50 to display advertisement on the advertisement frame 7.

The advertiser web server 70 is also a server, which is a general information processing apparatus, that provides information and functions to a client computer used by a viewer person (e.g., terminal apparatus 30) through the network N. When the viewer person clicks or taps the advertisement frame 7, the terminal apparatus 30 accesses the advertiser web server 70. The advertiser web server 70, operated by an advertiser, requests the DSP 20 to purchase the advertisement frame 7 for displaying the advertisement of one or more products and/or services of the advertiser, and requests the image distribution apparatus 10 to generate and display the advertisement. The advertisement means one or more advertisements in this description.

The advertiser web server 70, the partner site web server 60, and the terminal apparatus 30 communicate with each other using communication protocols, such as hypertext transfer protocol (HTTP) or hypertext transfer protocol secure (HTTPs). For example, in response to a request from the terminal apparatus 30, the advertiser web server 70 and the partner site web server 60 transmit screen-configuring information to the terminal apparatus 30. The screen-configuring information is a set of information described in, for example, hypertext markup language (HTML), script language, and cascading style sheet (CSS). Specifically, a structure of web page is described in the HTML, an operation on web page is described in the script language, and a style of web page is described in the CSS. In the embodiment, an operation performed to the web page by a viewer person (i.e., trigger operation) that effects to the full-view spherical image 6 is described in the script language. Specifically, the script language employs known program languages, such as JavaScript (registered trademark) or ECMAScript.

Both of the advertiser web server 70 and the partner site web server 60 record cookies related to the terminal apparatus 30. Hereinafter, the cookies may be simply referred to as the cookie. Specifically, the advertiser web server 70 records the cookie of an advertiser and the cookie of the DSP 20, and the partner site web server 60 records cookie of a partner and the cookie of the SSP 50.

The SSP 50 is designed to maximize revenues of the partner site web server 60 posting the advertisement frame 7 by selling the advertisement frame 7. Although the SSP 50 is described as one apparatus in FIG. 3, the SSP 50 includes one or more information processing apparatuses connected by a network wirelessly and/or by wire. The partner site web server 60 requests the SSP 50 to sell the advertisement frame 7. Specifically, an advertisement tag issued by the SSP 50 is set for the advertisement frame 7, and when the terminal apparatus 30 displays a web page of the partner site web server 60, the advertisement tag requests the SSP 50 to distribute an advertisement (advertisement request). Then, the SSP 50 receives a bid of the advertisement frame 7 from the DSP 20, and transmits access information a1 to be used for accessing the winning DSP 20 to the terminal apparatus 30.

The DSP 20 is designed to distribute advertisement efficiently and effectively for an advertiser, such as purchasing of the advertisement frame 7 and distributing of advertisement. Although the DSP 20 is described as one apparatus in FIG. 3, the DSP 20 includes one or more information processing apparatuses connected by a network wirelessly and/or by wire. That is, the DSP 20 acquires the cookie from the SSP 50 (hereinafter, SSP cookie), and determines attribute of a viewer person based on relational information of the DSP cookie managed by the DSP 20 and the SSP cookie. Then, the DSP 20 bids to the SSP 50 with a price that is determined based on advertisement distribution setting set by an advertiser that requests the advertisement based on the attribute of viewer persons and the budget.

The DSP 20, which has won the bid, is requested to transmit the advertisement from the terminal apparatus 30 using the access information a1. The DSP 20 notifies the advertisement request to the image distribution apparatus 10, and acquires the access information a2 from the image distribution apparatus 10. The access information a2 is used by the terminal apparatus 30 when the terminal apparatus 30 requests the advertisement data to the image distribution apparatus 10. The advertisement data includes, for example, a display program used for displaying the full-view spherical image 6, and an operation history program used for acquiring operation history information.

The DSP 20 transmits the access information a2 to the terminal apparatus 30. The DSP 20 charges a fee on an advertiser based on a contract. The fee billing is performed between the image distribution apparatus 10 and the advertiser based on the contract. However, the fee billing between the image distribution apparatus 10 and the advertiser may be different depending on the contract, such as the fee billing is performed by just displaying the advertisement.

The image distribution apparatus 10 includes, for example, one or more information processing apparatuses. The image distribution apparatus 10 provides advertisement data including advertisement material, such as the full-view spherical image 6, which is matched to the attribute of viewer person to the advertisement frame 7 purchased by the DSP 20. The image distribution apparatus 10 stores materials and advertisement images such as banners and text. The advertisement data may be simply a banner such as images made of text, photo or picture, or may include a script language in addition to images.

In the embodiment, the advertisement data includes, for example, a display program and an operation history program. The display program is used for rotating the full-view spherical image 6 along the displaying sequence, changing (rotating) the gazing direction of the 3DCG image along the displaying sequence, and changing a display mode (presentation mode) of the full-view spherical image 6 depending on the operation performed to the full-view spherical image 6 by a viewer person. The operation history program is used for recording a history of operations performed to the full-view spherical image 6 as the operation history information. These programs are described in a script language.

When the terminal apparatus 30 requests the advertisement data to the image distribution apparatus 10 based on the access information a2, the image distribution apparatus 10 transmits the advertisement data to the terminal apparatus 30. The advertisement data includes, for example, data of the full-view spherical image 6 and the 3DCG image. The display program is used to automatically rotate the full-view spherical image 6 so that the full-view spherical image 6 is rotated among a plurality of the gazing regions A one to another while the full-view spherical image 6 can be enlarged or reduced in size. Further, the advertisement display unit 40, executing the operation history program, displays the 3DCG image by changing the gazing direction of the 3DCG image. Further, the advertisement display unit 40, executing the operation history program, transmits a cookie (called as image cookie) of the image distribution apparatus 10 and an image ID to the image distribution apparatus 10 together with the operational history information of the full-view spherical image 6 and the 3DCG image. The operation history information includes, for example, information indicating which gazing region and which angle of view have been used for displaying the full-view spherical image 6, and/or information indicating which gazing direction and which size (e.g., pixel numbers of vertical direction and horizontal direction) have been used for displaying the 3DCG image. Since the operation history information is used to determine the target gazing region and the target gazing direction, the operation history information may not be transmitted if the operation history information is not used to determine the gazing region and/or the gazing direction.

Further, the operation history program is used to transmit a notice indicating a clicking operation to the image distribution apparatus 10 together with a pattern identification (ID) of a display pattern, to be described later. The image distribution apparatus 10 defines a plurality of display patterns for the full-view spherical image 6 one by one. The image distribution apparatus 10 can be configured to distribute one or more display patterns having a higher clicking rate alone by monitoring the clicking rate of the plurality of display patterns. Similarly, the image distribution apparatus 10 can be used to define a plurality of display patterns of gazing directions for the 3DCG image one by one. The image distribution apparatus 10 can be configured to distribute one or more display patterns having a higher clicking rate based on a monitoring result of the clicking rate of the plurality of display patterns.

Hardware Configuration

Figure 4:
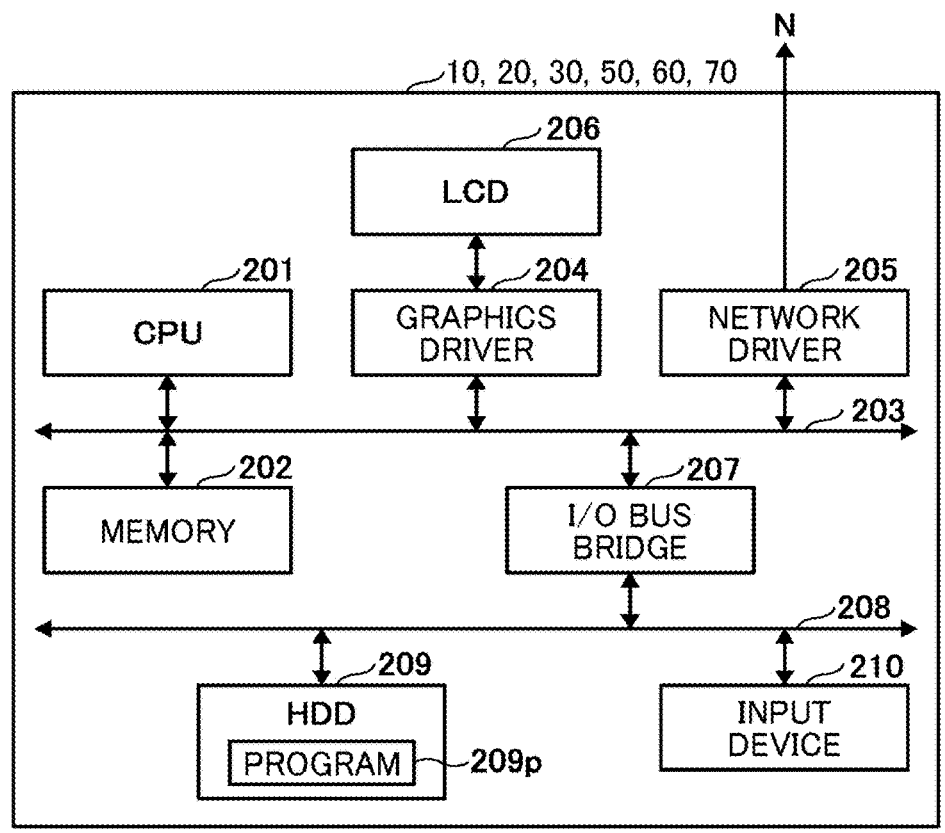
FIG. 4 is an example block diagram of a hardware configuration of a terminal apparatus, an advertiser web server, a partner site web server, a demand-side platform (DSP), a supply side platform (SSP), and an image distribution apparatus, according to an embodiment of the present disclosure.

FIG. 4 illustrates an example of a hardware block diagram of the terminal apparatus 30. The terminal apparatus 30 can be implemented using a personal computer, a workstation, or an appliance server. As illustrated in FIG. 4, the terminal apparatus 30 includes, for example, a central processing unit (CPU) 201, and a memory 202 enabling high-speed accessing of data used by the CPU 201. The CPU 201 and the memory 202 are connected to other devices or drivers in the terminal apparatus 30, such as a graphics driver 204 and a network driver 205 (e.g., network interface card) via a system bus 203.

The graphics driver 204 is connected to a liquid crystal display (LCD) 206, used as a display, via a bus to monitor a processing result of the CPU 201 using the LCD 206. The LCD 206 may integrally include a touch panel. In this case, a viewer person can perform an operation on the terminal apparatus 30 using a finger as an operation device.

Further, the network driver 205 connects the terminal apparatus 30 to the network N at the levels of the transport layer and the physical layer level, to establish a session with the advertiser web server 70 or the like.

The system bus 203 is further connected with an input/output (I/O) bus bridge 207. A storage device such as a hard disk drive (HDD) 209 is connected to the downstream side of the I/O bus bridge 207 via an I/O bus 208 such as peripheral component interconnect (PCI) via an integrated development environment (IDE), advanced technology attachment (ATA), advanced technology attachment packet interface (ATAPI), Serial ATA, small computer system interface (SCSI), universal serial bus (USB) and the like. Instead of the HDD 209, a solid-state drive (SSD) may be provided, or both of the SSD and the HDD 209 may be provided.

The HDD 209 stores program 209p used for controlling the terminal apparatus 30 entirely. The program 209p includes, for example, the browser 8, and the screen-configuring information transmitted from the advertiser web server 70, the partner site web server 60, and the DSP 20. The terminal apparatus 30 executes the browser 8, and the display program and the operation history program included the screen-configuring information. The program 209p further includes, for example, the advertisement tag, the access information a1 and a2, and the like.

The I/O bus 208 is connected to an input device 210, such as a keyboard and a mouse (referred to as a pointing device) via a bus such as USB. The input device 210 receives inputs and commands by an operator such as a viewer person.

The hardware configuration of the advertiser web server 70, the partner site web server 60, the SSP 50, the DSP 20, and the image distribution apparatus 10 are same as the configuration of FIG. 4, or may be different for some portions not related to the features of the embodiment. Preferably, the advertiser web server 70, the partner site web server 60, the DSP 20, and the image distribution apparatus 10 are compatible with the cloud computing. The cloud computing means one or more resources such as hardware resources on the network are used collectively and, cooperatively. When the cloud computing is used, the hardware configuration illustrated in FIG. 4 is not required to be disposed in one casing or one apparatus. The hardware configuration of FIG. 4 indicates hardware resources preferably disposed in the advertiser web server 70, the partner site web server 60, the DSP 20, and the image distribution apparatus 10. Further, when the cloud computing is used, the hardware configuration of the advertiser web server 70, the partner site web server 60, the DSP 20, and the image distribution apparatus 10 can be configured by dynamically connecting and disconnecting hardware resources depending on processing loads or the like.

Full-View Spherical Image

Figure 5:
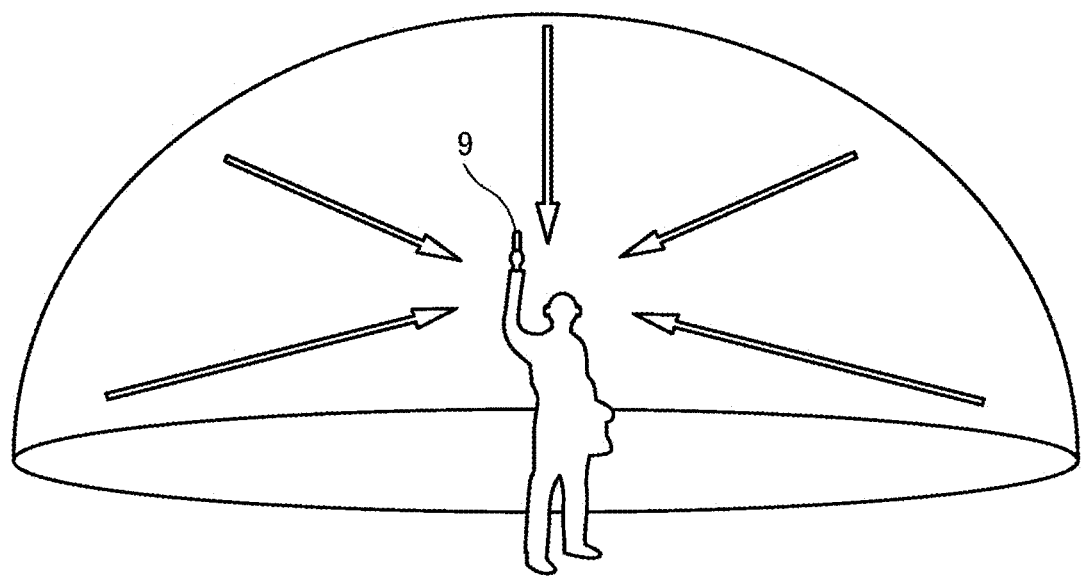
FIG. 5 illustrates a scheme of use of a full-view spherical camera, according to an embodiment of the present disclosure.

Hereinafter, a description is given of the full-view spherical image 6 with reference to FIGS. 5 to 8. FIG. 5 illustrates a scheme of use of a full-view spherical camera 9. As illustrated in FIG. 5, a user holding or carrying the full-view spherical camera 9 in his or her hand captures images of one or more objects around the user using the full-view spherical camera 9. The full-view spherical camera 9 is configured by two image capture elements opposed to each other in a casing, and two hemispherical images are acquired by capturing the images of one or more objects around the user using the two image capture elements.

Figure 6A:
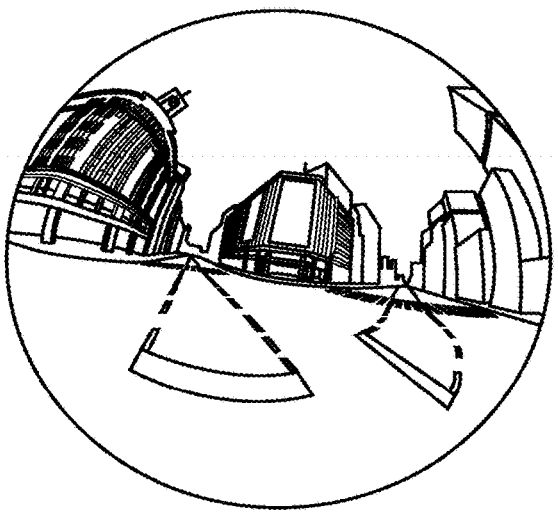
FIGS. 6A, B and 6C (FIG. 6) illustrate a scheme of generating a full-view spherical image from hemispherical images captured by a full-view spherical camera, according to an embodiment of the present disclosure.
Figure 6B:
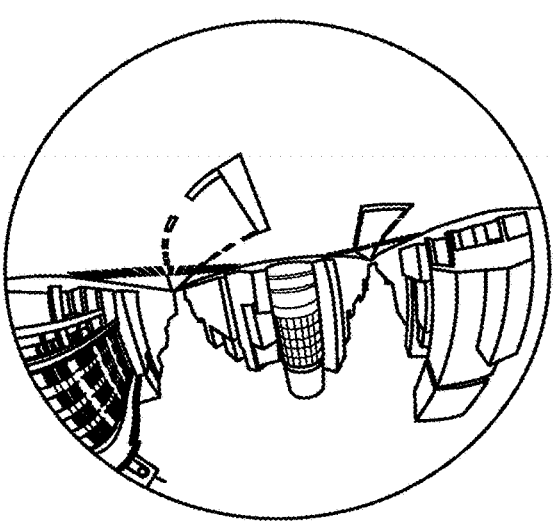
Figure 6C:
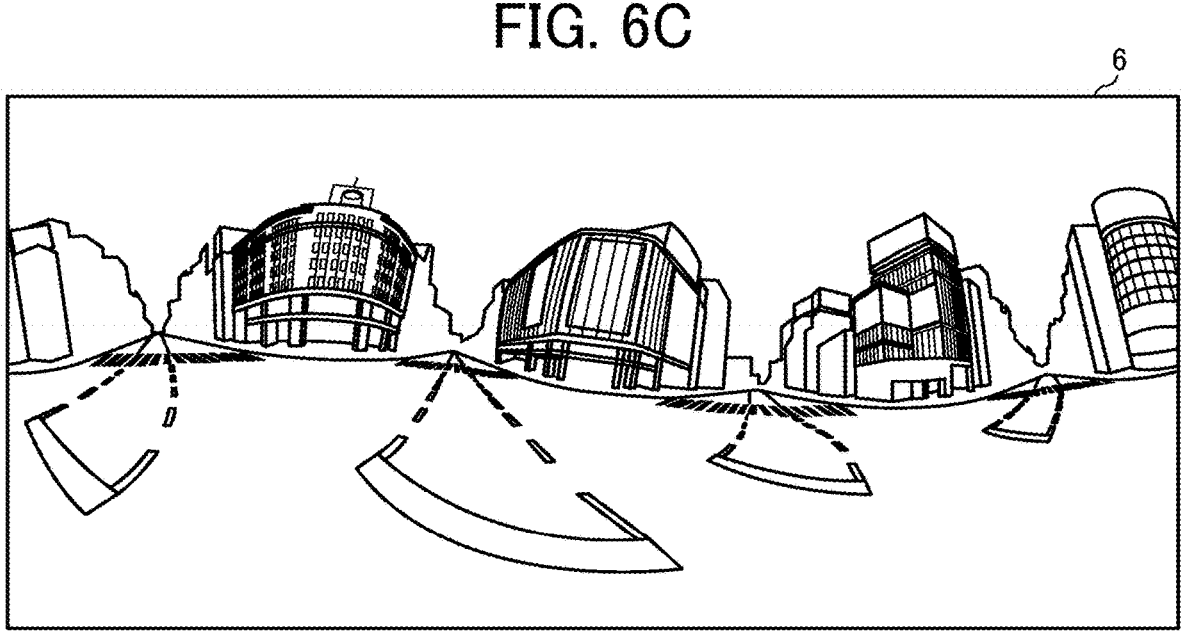

Hereinafter, a description is given of a scheme of generating the full-view spherical image 6 from images captured by the full-view spherical camera 9 with reference to FIGS. 6 and 7. FIG. 6A illustrates one hemispherical image at a front side captured by the full-view spherical camera 9. FIG. 6B illustrates another hemispherical image at a rear side captured by the full-view spherical camera 9. FIG. 6C illustrates an image expressed by using the Mercator method (hereinafter, Mercator image) or the equirectangular projection method (hereinafter, "equirectangular projection image"). FIG. 7A illustrates a schematic view that a sphere is covered by the equirectangular projection image. FIG. 7B illustrates an example of the full-view spherical image 6.

As illustrated in FIG. 6A, one image captured by the full-view spherical camera 9 becomes the hemispherical image at the front side, which is curved by one fisheye lens. Further, as illustrated in FIG. 6B, another image captured by the full-view spherical camera 9 becomes the hemispherical image at the rear side, which is curved by another fisheye lens. Then, the hemispherical image at the front side and another hemispherical image at the rear side, which are reversed for 180 degrees, are synthesized by the full-view spherical camera 9 to generate the equirectangular projection image as illustrated in FIG. 6C.

Then, when Open Graphics Library for Embedded Systems (OpenGL ES: registered trademark) is applied, the equirectangular projection image is transferred on a sphere by covering the sphere as illustrated in FIG. 7A, and then the full-view spherical image 6 is generated as illustrated in FIG. 7B. As indicated in FIG. 7B, the full-view spherical image 6 is expressed as an image that the equirectangular projection image is directed toward the center of the sphere. The OpenGL ES is a graphics library used for generating images from two-dimension (2D) data and three-dimension (3D) data. The full-view spherical image 6 can be either still image or movie image.

The advertisement data distributed by the image distribution apparatus 10 includes the full-view spherical image 6. Since an image transferred on a surface of the sphere by covering the sphere becomes the full-view spherical image 6 such as a curved image, when a viewer person sees the full-view spherical image 6, the viewer person may feel puzzlement. Therefore, the terminal apparatus 30 displays the specific region T, which is a part of the full-view spherical image 6, as a plane image reducing curvature so that the viewer person may not feel the sense of incongruity. The specific region T is defined by coordinates of (X, Y, Z) in a virtual three-dimensional space. Since the LCD 206 is a two-dimensional plane, the terminal apparatus 30 cannot display the specific region T defined in the virtual three-dimensional space. Therefore, the terminal apparatus 30 acquires the target image T using the 3D computer graphics technique, such as a perspective projection transformation method that projects a three-dimensional object on the two-dimensional plane. With this configuration, the specific region T in the full-view spherical image 6 illustrated in FIG. 1 can be displayed on the LCD 206 as a display region.

Figure 8:
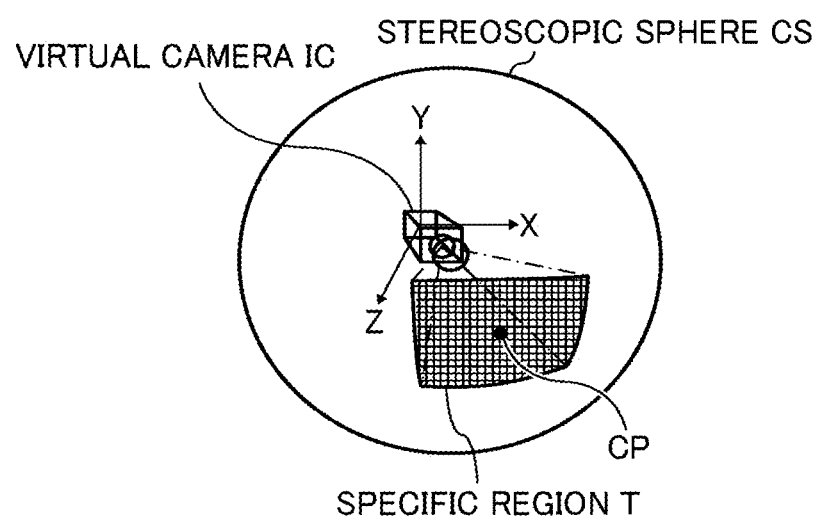
FIG. 8 illustrates an example of a viewing direction of a viewer person, according to an embodiment of the present disclosure.

FIG. 8 illustrates an example of a viewing direction of a viewer person. Since the full-view spherical image 6 has three dimensional coordinates, the viewing direction can be identified by information specifying coordinates on a sphere, such as coordinates in the three-dimensional space, and latitude and longitude in the three-dimensional space. In the embodiment, the center "CP" of the specific region T is set as the viewing direction.

The viewing direction can be changed by a viewer person by performing an operation. If it is assumed that the virtual camera IC does not move in a parallel direction, the virtual camera IC can rotate as a rigid body with three patterns such as roll (i.e., rotation about the Z-axis), yaw (i.e., rotation about the Y axis), and pitch (i.e., rotation about the X axis). When any one of the three rotations occur, the viewing direction changes. For example, when the viewer person rotates the full-view spherical image 6 along the horizontal direction, the yaw angle changes, when the viewer person rotates the full-view spherical image 6 in the vertical direction change, the pitch angle changes, and when the viewer person rotates the full-view spherical image 6 about the center of the LCD 206, the roll angle changes. In the embodiment, the operation performed by the viewer person on a web page triggers the change of the viewing direction (e.g., roll angle, yaw angle, pitch angle). It is assumed that the display program includes descriptions how the viewing direction is changed depending on the operation performed on the web page.

Function

FIG. 9 (9A, 9B) illustrates an example of a functional block diagram of the terminal apparatus 30, the advertiser web server 70, the partner site web server 60, the image distribution apparatus 10, the SSP 50, and the DSP 20.

Advertiser Web Server/Partner Site Web Server

As illustrated in FIG. 9, each of the advertiser web server 70 and the partner site web server 60 includes, for example, a web page providing unit 71. Each of functions of the advertiser web server 70 and the partner site web server 60 is a functional unit or means implemented by executing the program 209p, loaded from the HDD 209 to the memory 202, using the CPU 201.

The web page providing unit 71 performs, for example, a general HTTP communication, configures a web page based on a request for the web page received from the terminal apparatus 30, and transmits the web page to the terminal apparatus 30. If necessary, the web page providing unit 71 requests processing to an application server, receives a processing result from the application server, and then applies the processing result on the web page and transmits the web page to the terminal apparatus 30.

The web page provided by the advertiser web server 70 includes the advertiser cookie and the DSP cookie. This is because the advertiser web server 70 requests the DSP 20 to distribute the advertisement. This configuration enables retargeting (or behavioral retargeting) advertising.

The web page provided by the partner site web server 60 includes the cookie of the partner site web server 60 and the SSP cookie. This is because the partner site web server 60 requests the SSP 50 to sell the advertisement frame 7. The web page providing unit 71 is implemented by executing the program 209p using the CPU 201 illustrated in FIG. 4.

SSP

As illustrated in FIG. 9, the SSP 50 includes, for example, an advertisement request acquiring unit 52, an advertisement requesting unit 51, an access information transmitting unit 53, and a bid winning unit 54. Each of functions of the SSP 50 is a functional unit or means implemented by executing the program 209p, loaded from the HDD 209 to the memory 202, using the CPU 201.

The advertisement request acquiring unit 52 acquires an advertisement request, which is requested with the SSP cookie by the terminal apparatus 30 when the terminal apparatus 30 executes the advertisement tag associated with the advertisement frame 7. Then, the advertisement request acquiring unit 52 transmits the advertisement request including the SSP cookie to the advertisement requesting unit 51. The advertisement request acquiring unit 52 is implemented by executing the program 209p using the CPU 201 of FIG. 4.

The advertisement requesting unit 51 transmits the advertisement request to the DSP 20. The advertisement request includes, for example, the SSP cookie, a domain of the partner site web server 60, an advertisement frame ID, an advertisement frame size, an advertisement format, a browser type, and an operating system (OS) type. The advertisement requesting unit 51 is implemented by executing the program 209p using the CPU 201 of FIG. 4.

The bid winning unit 54 receives a bid from the DSP 20, and performs auction to sell the advertisement frame 7 to the DSP 20 setting the highest bidding amount in most of cases. However, the bid winning unit 54 may not receive bids depending on products or services of advertisers. The bid winning unit 54 generates a bid winning ID, and notifies the bid winning ID to the DSP 20. The bid winning unit 54 is implemented by executing the program 209p using the CPU 201 of FIG. 4.

The access information transmitting unit 53 generates the access information a1 sued for requesting an advertisement to the DSP 20, which has won the bid, and transmits the access information a1 to the terminal apparatus 30. The access information a1 includes a uniform resource locator (URL), such as internet protocol (IP) address, of the DSP 20. The access information transmitting unit 53 is implemented by executing the program 209p using the CPU 201 of FIG. 4.

DSP

As illustrated in FIG. 9, the DSP 20 includes, for example, a request receiving unit 21, a bidding determination unit 22, a bidding unit 23, an advertisement request receiving unit 24, an image requesting unit 25, and a storage unit 29. Each of functions of the DSP 20 is a functional unit or means implemented by executing the program 209p, loaded from the HDD 209 to the memory 202, using the CPU 201.

Further, a cookie information DB 291 and a distribution setting DB 292 are configured in the storage unit 29. The storage unit 29 is implemented by the HDD 209 or the memory 202 of FIG. 4.

TABLE 1

Cookie Information DB

| DSP cookie | SSP cookie | Visit Domain 1 | Visit Domain 2 |
|---|---|---|---|
| 1234 | ABCD | zzz.com | xxx.com |
| 2345 | BCDE | yyy.com | vvv.com |
| — | — | — | — |

Table 1 schematically illustrates information stored in the cookie information DB 291. The cookie information DB 291 associates the DSP cookie and the SSP cookie, and registers a visiting domain visited by a specific viewer person. The association of DSP cookie and SSP cookie can be performed using a technique referred to as the cookie sync. The visiting domain is acquired when the specific viewer person visits a web site attached with a tag (e.g., action monitoring tag) by the DSP 20. Therefore, the DSP 20 can identify the DSP cookie from the SSP cookie, and can determine which web site is interested by the specific viewer person.

TABLE 2

Distribution Setting DB

| Advertiser ID | Attribute of Target of Advertisement | Attribute of Non-Target of Advertisement |
|---|---|---|
| 001 | Male<br>Age: 30s<br>17:00-24:00 | Minors |
| 002 | Female<br>Age: 30s-60s<br>10:00-17:00 | Male |
| — | — | — |

Table 2 schematically illustrates information stored in the distribution setting DB 292. The distribution setting DB 292 registers an advertiser ID, an advertisement target attribute (attribute of relevant target or preferred target), and a non-advertisement target attribute (attribute of irrelevant target or non-preferred target). The advertiser ID is identification information identifying or specifying an advertiser serving as a provider that provides images, such as wide-angle images. With this configuration, the DSP 20 or the image distribution apparatus 10 can determine whether transmitting the wide-angle image by referring to the attribute of relevant target and the attribute of irrelevant target set for the provider of the wide-angle image.

The ID is an abbreviation of identification, and it means identifier or identification information. The ID employs, for example, a name, a sign, a string of characters, a numerical value, or a combination of one or more of these for uniquely distinguishing a specific target from a plurality of targets. The same is applied to the following IDs. The advertisement target attribute is the attribute of viewer persons to whom an advertiser wants to distribute the advertisement, and the non-advertisement target attribute is the attribute of viewer persons to whom the advertiser does not want to distribute the advertisement. The DSP 20 compares the attribute of viewer person determined by the cookie information DB 291 and the information of the distribution setting DB 292 to quantify the attribute of viewer person as a numerical value, and determines the bid amount. When determining the bid amount, various information may be considered, such as a time slot, day of the week, region of viewer person, or the like.

Function of DSP

As illustrated in FIG. 9, the request receiving unit 21 receives the advertisement request from the SSP 50. Basic information, such as the advertisement frame ID of the terminal apparatus 30, is acquired by the advertisement request used as the request information. The request receiving unit 21 is implemented by executing the program 209p using the CPU 201 of FIG. 4.

The bidding determination unit 22 evaluates the advertisement request, received by the request receiving unit 21, by referring the cookie information DB 291 and the distribution setting DB 292, to determine the bid amount. However, the bidding determination unit 22 may not perform the bidding in some cases. As described above, the DSP cookie is identified from the SSP cookie, and then the bid amount is determined in accordance with a matching level between the stored attribute information associated with the DSP cookie and the advertiser request stored in the distribution setting DB 292. The bidding determination unit 22 is implemented by executing the program 209p using the CPU 201 of FIG. 4.

The bidding unit 23 bids the SSP 50 with the determined bid amount. The bidding unit 23 is implemented by executing the program 209p using the CPU 201 of FIG. 4. If the bid is successful, the bidding unit 23 acquires the bid winning ID, and associates the e bid winning ID with the advertisement request.

The advertisement request receiving unit 24 acquires the advertisement request (bid winning ID, DSP cookie) from the terminal apparatus 30 based on the access information a1. The advertisement request receiving unit 24 identifies the advertisement request based on the bid winning ID. The DSP cookie can be omitted in some cases. The advertisement request is used when the SSP cookie and the DSP cookie are not associated with each other. The advertisement request receiving unit 24 is implemented by executing the program 209p using the CPU 201 of FIG. 4.

The image requesting unit 25 requests the access information a2 to the image distribution apparatus 10 together with the DSP cookie, the advertiser ID, and request content. The advertiser is identified by the advertiser ID. The advertisement frame 7 is identified by the advertisement frame ID of the request content. Further, the attribute of viewer person may be transmitted to the image distribution apparatus 10 from the image requesting unit 25. With this configuration, the image distribution apparatus 10 can distribute the full-view spherical image 6 matched to the attribute of viewer person. The image requesting unit 25 is implemented by executing the program 209p using the CPU 201 of FIG. 4.

Terminal Apparatus

Figure 9B:
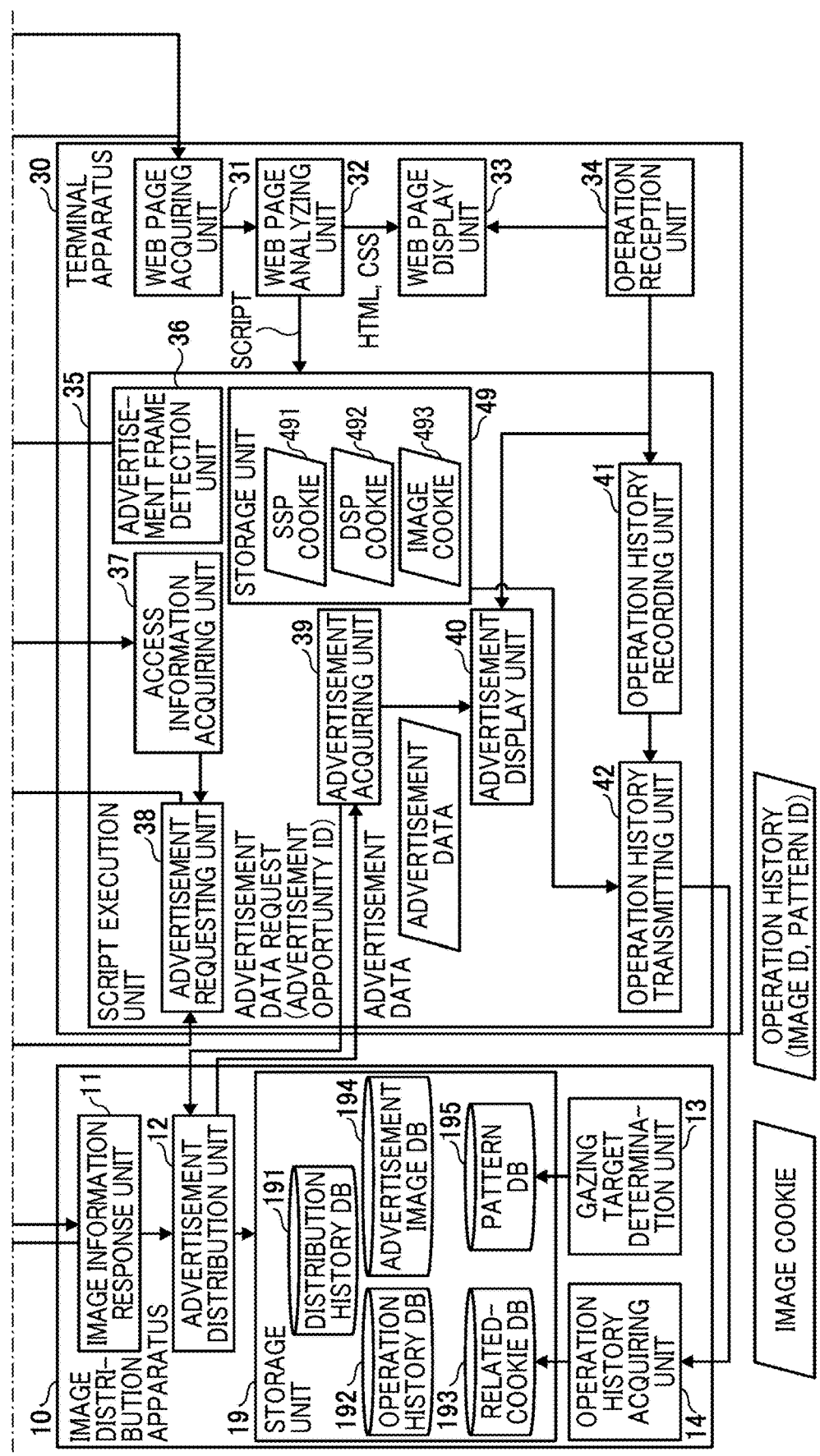

As illustrated in FIG. 9B, the terminal apparatus 30 includes, for example, a web page acquiring unit 31, a web page analyzing unit 32, a web page display unit 33, an operation reception unit 34, and a script execution unit 35. Each of functions of the terminal apparatus 30 is a functional unit or means implemented by executing the program 209p, loaded from the HDD 209 to the memory 202, using the CPU 201.

The operation reception unit 34 receives various operations performed to the terminal apparatus 30. Specifically, the operation reception unit 34 receives an operation performed to a browser executed by the terminal apparatus 30. When a web page includes a program described in a script language, such as the above script language, the operation reception unit 34 receives an operation performed for the web page. The performed operation is used as a trigger of activating the script program. In the embodiment, an operation performed to the terminal apparatus 30, an operation performed to the browser, and an operation performed to the web page are not strictly distinguished each other, but the operation performed to the terminal apparatus 30, the operation performed to the browser, and the operation performed to the web page may be the substantially similar operations. The operation reception unit 34 is implemented by executing the program 209p, and controlling the input device 210 and the touch panel using the CPU 201 of FIG. 4.

The web page acquiring unit 31 communicates with the advertiser web server 70 and the partner site web server 60 based on the operation of the viewer person and/or the activation of the script, and acquires a web page from the advertiser web server 70 and the partner site web server 60. The web page acquiring unit 31 is implemented by executing the program 209p and controlling the network driver 205 using the CPU 201 of FIG. 4.

The web page analyzing unit 32 reads HTML included in the screen-configuring information from the beginning of the HTML sequentially, and analyzes a structure of text included in the HTML and image data. Further, the web page analyzing unit 32 detects an association of the text included in HTML described in CSS and the image data, and associates the text included in HTML and a style of the image data. Further, the web page analyzing unit 32 detects a script tag from the HTML to extract a script described in a script language. The web page analyzing unit 32 transmits the HTML and CSS to the web page display unit 33, and transmits the script to the script execution unit 35. The web page analyzing unit 32 is implemented by executing the program 209p using the CPU 201 of FIG. 4.

The web page display unit 33 displays the web page on the LCD 206 in the order of completing the analysis, which is from the beginning of the HTML. Further, the web page display unit 33 updates the web page in accordance with the operation performed to the web page. The web page display unit 33 is implemented by executing the program 209p using the CPU 201 of FIG. 4.

The script execution unit 35 executes the script extracted by the web page analyzing unit 32. Specific contents of the script vary depending on the web page. In the embodiment, the advertisement tag associated with the advertisement frame 7, the access information a1 acquired from the SSP 50, the access information a2 acquired from the DSP 20, and the advertisement data distributed from the image distribution apparatus 10 are detected as the script. The script execution unit 35 is implemented by executing the program 209p using the CPU 201 of FIG. 4. As illustrated in FIG. 9, the script execution unit 35 includes, for example, an advertisement frame detection unit 36, an access information acquiring unit 37, an advertisement requesting unit 38, an advertisement acquiring unit 39, an advertisement display unit 40, an operation history recording unit 41, an operation history transmitting unit 42, and a storage unit 49. Each of the functional units or means of the script execution unit 35 is implemented by executing the script using the CPU 201.

The advertisement frame detection unit 36 is a functional unit, which is implemented when the terminal apparatus 30 executes the advertisement tag associated with the advertisement frame 7 included in the screen-configuring information acquired by the web page acquiring unit 31. The advertisement frame detection unit 36 transmits the advertisement request to the SSP 50 together with the SSP cookie based on the URL associated with the advertisement frame 7.

The access information acquiring unit 37 acquires the access information a1 from the SSP 50. The access information a1 is described in the script language.

The advertisement requesting unit 38 accesses the DSP 20 based on the URL included in the access information a1, and requests the advertisement with the bid winning ID and the DSP cookie to the DSP 20. Then, the advertisement requesting unit 38 acquires the access information a2 and advertisement opportunity ID from the DSP 20 as a response of the request transmitted to the DSP 20. The access information a2 is also described in the script language.

Based on the URL of the image distribution apparatus 10 included in the access information a2, the advertisement acquiring unit 39 designates an advertisement opportunity ID and requests the advertisement data to the image distribution apparatus 10. Since the image distribution apparatus 10 is configured to generate the advertisement data, the advertisement acquiring unit 39 acquires the advertisement data from the image distribution apparatus 10.

The advertisement data includes, for example, the full-view spherical image 6, the display pattern, the display program, and the operation history program. The operation history program is executed to transmit the operation history information to the image distribution apparatus 10 from the terminal apparatus 30. The display program is executed to rotate the full-view spherical image 6 based on the display pattern, and to change a display mode (presentation mode) of the full-view spherical image 6 depending on the operation performed to the full-view spherical image 6. The operation history program and the display program are also described in the script language, and executed by the script execution unit 35.

The advertisement display unit 40 displays the advertisement data acquired from the image distribution apparatus 10. The advertisement display unit 40 is mainly implemented by executing the display program. The advertisement display unit 40 displays the full-view spherical image 6 (i.e., advertisement) on the advertisement frame 7, and automatically rotates the full-view spherical image 6 among a plurality of the gazing regions. Further, the display mode (presentation mode) of the full-view spherical image 6 is changed in accordance with the operation performed to the full-view spherical image 6.

By acquiring the advertisement data from the image distribution apparatus 10, the terminal apparatus 30 can acquire the image cookie of the image distribution apparatus 10 and store the image cookie in the storage unit 49. By transmitting the image cookie to the image distribution apparatus 10 using the advertisement acquiring unit 39, the DSP cookie and the image cookie can be associated with each other in the image distribution apparatus 10.

The operation history recording unit 41 is implemented mainly by executing the operation history program, and records operation information, which is information of operations performed on the full-view spherical image 6, as the operation history information. The detail of the operation history information is to be described later with reference to the image distribution apparatus 10.

The operation history transmitting unit 42 is implemented mainly by executing the operation history program. The operation history transmitting unit 42 transmits the operation history performed to the full-view spherical image 6 displayed on the advertisement frame 7 to the image distribution apparatus 10 with the image cookie and the image ID used for identifying the full-view spherical image 6. Further, when a clicking operation is performed, the operation history transmitting unit 42 further transmits clicking operation history information to the image distribution apparatus 10 together with the display pattern.

Image Distribution Apparatus

As illustrated in FIG. 9B, the image distribution apparatus 10 includes, for example, an image information response unit 11, an advertisement distribution unit 12, a gazing target determination unit 13, and an operation history acquiring unit 14. The image distribution apparatus 10 may further include an operation history analysis unit. Each of functions of the image distribution apparatus 10 is a functional unit or means implemented by executing the program 209p, loaded from the HDD 209 to the memory 202, using the CPU 201.

The image distribution apparatus 10 further includes a storage unit 19, implemented by the HDD 209 or the memory 202 of FIG. 4. The storage unit 19 stores, for example, a distribution history DB 191, an operation history DB 192, a related-cookie DB 193, an advertisement image DB 194, and a pattern DB 195.

TABLE 3

Operation History DB (Background Image)

| Image ID | Browsing Time | Image Cookie | Browsing Angle 1 | Browsing Angle 2 | Browsing Angle 3 |
|---|---|---|---|---|---|
| G001-1 | 2017/10/10 12:20 | cookie name; cookie value; effective period; domain | (Xs1, Ys1) (Xe1, Ye1) enlargement: yes; reduction of browsing angle after enlargement: no; still time: 10 seconds | (Xs2, Ys2) (Xe2, Ye2) enlargement: no; reduction: yes; still time: 5 seconds | (Xs3, Ys3) (Xe3, Ye3) enlargement: yes; reduction of browsing angle after enlargement: no; still time: 3 seconds |
| — | — | — | — | — | — |

Table 3 schematically illustrates information stored in the operation history DB 192. The operation history DB 192 records history information of the operation performed by each viewer person on the full-view spherical image 6. Specifically, the operation history DB 192 records image ID, browsing time, image cookie, and browsing angles 1 to 3.

The image ID is information identifying the full-view spherical image 6. The image cookie is information identifying the identity of each viewer person operating the terminal apparatus 30 or the identity of the terminal apparatus 30, which is an example of apparatus identification information. The browsing angles 1 to 3 indicate the angle of view when the viewer person browsed the full-view spherical image 6. Each of the browsing angles 1 to 3 stores, for example, browsing time, enlargement (yes/no), angle of view after enlargement, and reduction (yes/no). In this way, the angle of view that was considered to attract the interest of the viewer person is recorded for each image. Each of the browsing angles 1 to 3 indicates an angle of view when the viewer person does not rotate the full-view spherical image 6 for a given time (e.g., one second) or more.

The operation history recording unit 41 of the terminal apparatus 30 records, for example, the browsing angles (i.e., angle of views) corresponding to the top three for the still time. Further, the operation history recording unit 41 of the terminal apparatus 30 may record one angle of view, or four angles of views or more for the still time. Similarly, the operation history recording unit 41 records whether the viewer person enlarged or reduced the image at each of the browsing angles 1 to 3. The image distribution apparatus 10 may use the operation history information to set the gazing region A. Further, if the image cookie is associated with the image ID, the retargeting advertising can be performed. Further, the browsing angle (angle of view) corresponding to the clicking operation may be recorded as the operation history information.

TABLE 4

Operation History DB (Superimposed Image)

| Image ID | Browsing Time | Image Cookie | Browsing direction 1 | Browsing direction 2 | Browsing direction 3 |
|---|---|---|---|---|---|
| G002-1 | 2017/10/10 12:20 | cookie name; cookie value; effective period; domain | (Xs1, Ys1, Zs1) (Xe1, Ye1, Ze1) enlargement: yes; reduction of size after enlargement: no; still time: 10 seconds | (Xs2, Ys2, Zs2) (Xe2, Ye2, Ze2) enlargement: no; reduction: yes; still time: 5 seconds | (Xs3, Ys3, Zs3) (Xe3, Ye3, Ze3) enlargement: yes; reduction of size after enlargement: no; still time: 3 seconds |
| — | — | — | — | — | — |

Table 4 schematically illustrates information stored in the operation history DB 192. The operation history DB 192 records history information of the operation performed by each viewer person to the 3DCG image. Specifically, the operation history DB 192 records image ID, browsing time, image cookie, and browsing directions (gazing directions) 1 to 3. The image ID is the information identifying the 3DCG image.

The image cookie is information identifying the identity of each viewer person operating the terminal apparatus 30 or the identity of the terminal apparatus 30, which is an example of apparatus identification information. The browsing directions (gazing directions) 1 to 3 indicate the gazing directions when the viewer person views the 3DCG image. For each of the browsing directions (gazing directions) 1 to 3, for example, browsing time, enlargement (yes/no), enlarged size (e.g., pixel numbers of vertical direction and horizontal direction) when enlarged, reduction (yes/no), reduction size (e.g., pixel numbers of vertical direction and horizontal direction) when reduced are stored. In this way, the gazing direction that is considered to attract the interest of the viewer person is recorded for each image. Each of the browsing directions (gazing directions) 1 to 3 indicates an angle of view when the viewer person does not rotate the 3DCG for a given time (e.g., one second) or more.

The operation history recording unit 41 of the terminal apparatus 30 records, for example, the browsing directions (gazing directions) corresponding to the top three for the still time. The operation history recording unit 41 of the terminal apparatus 30 may record one gazing direction (browsing direction), or four browsing directions (gazing directions). Similarly, the operation history recording unit 41 records whether the viewer person has enlarged or reduced the image at each of the browsing directions (gazing directions) 1 to 3. The image distribution apparatus 10 may use the operation history information to set the gazing region A. Further, if the image cookie is associated with the image ID, the retargeting advertising can be performed. Further, the browsing direction (gazing direction) corresponding to the clicking operation may be recorded as the operation history information.

TABLE 5

Advertisement Image DB

| Advertiser ID | Image ID | Priority Level | Attribute of Target of Advertisement |
|---|---|---|---|
| 001 | G001-1 | A | Male/Married/30s |
|  | G001-2 | C | Female/Single/40s |
|  | G001-3 | B | Male/Single/20s |
| — | — | — | — |
| 002 | G002-1 | A | Female/Single/30s |
| — | — | — | — |

Table 5 schematically illustrates information stored in the advertisement image DB 194. The advertisement image DB 194 registers information relating to the full-view spherical image 6 used as the to-be-advertised image. The advertisement image DB 194 registers, for example, advertiser ID, image ID, priority level, and target attribute by associating these data. The advertiser is determined by the DSP 20. Therefore, among the images to be distributed by the advertiser, images to be distributed are determined based on at least one of the matching level of the attribute of viewer person and the target attribute set in Table 5, and the priority level set in Table 5. In a case of the retargeting advertising, images associated with the image cookie in the operation history DB 192 are distributed.

TABLE 6

Related-cookie DB

| DSP Cookie | Image Cookie |
|---|---|
| 1234 | 12AB |
| 2345 | 34CD |
| — | — |

Table 6 schematically illustrates information stored in the related-cookie DB 193. The related-cookie DB 193 stores the DSP cookie and the image cookie associated with each other. The DSP cookie is notified from the DSP 20, and the image cookie is notified from the terminal apparatus 30. By associating the DSP cookie and the image cookie, the image distribution apparatus 10 can determine the viewer person using the DSP cookie alone.

TABLE 7

Pattern DB

| Image ID | Pattern ID | Display Pattern | Combination of Angle of View of Coordinates 1 to 4, Each Angle Changeable in Three Steps | Number of Clicks (Total: 81) | | |
|---|---|---|---|---|---|---|
| G001-1 | P001 | coordinates 1→2→3→4 | Coordinates: 1 (large, middle, small); 2 (large, middle, small); 3 (large, middle, small); 4 (large, middle, small). Total: 81 combinations | 5 9 2 6 1 | 8 3 6 5 4 | 19 11 — — 3 |
|  | P002 | coordinates 1→2→4→3 | same as above | — | | |
|  | P003 | coordinates 1 →3 →2→4 | same as above | — | | |
|  | P004 | coordinates 1 →3 →4→2 | same as above | — | | |
| — | — | — | — | — | | |

Table 7 schematically illustrates information registered in the pattern DB 195. The pattern DB 195 registers, for example, a combination of a displaying sequence of the gazing regions A, and the angle of view of the gazing regions A within the full-view spherical image 6. The combination of the displaying sequence and the angle of view is referred to as a display pattern. In Table 7, four coordinates 1 to 4 are set as the gazing regions A. The number of the gazing regions A may be four or more for one full-view spherical image 6, or may be three or less, or five or more. Further, the number of the gazing regions A may vary depending on the full-view spherical image 6.

The display pattern indicates the displaying sequence of the coordinates 1 to 4. Therefore, when the number of the gazing regions A is four, the number of patterns of the displaying sequence becomes the factorial of 4, that is 4×3×2×1=24. Further, when the angle of view of each gazing region A is changed in, for example, three steps, the number of patterns of the angle of view becomes 3 to the fourth power ($3^4$) Therefore, the total of 81 combinations are set for the angle of view with respect to one displaying sequence. Therefore, the number of display patterns for one full-view spherical image becomes 24×81.

The number of times of clicking operation indicates the number of times that the viewer person clicks each display pattern. The clicking operation is an example of specific operations performed on the full-view spherical image 6 in this description. That is, the image distribution apparatus 10 uses a plurality of terminal apparatuses 30 to display the same full-view spherical image 6 on the plurality of terminal apparatuses 30 using the same display pattern, and each of the terminal apparatuses 30 records the clicking operation. With this configuration, the distribution using a display pattern having a lower clicking rate can be gradually reduced. Further, it is preferable that the number of times of clicking operation is recorded for each attribute of viewer person, such as sex, age, and family member. With this configuration, the full-view spherical image 6 can be displayed using the display pattern having a relatively large number of times of clicking operation with respect to the attribute of viewer person.

Further, the pattern DB 195 also registers a combination of the displaying sequence and the gazing direction of 3DCG. In Table 7, since the "angle of view" is simply replaced with the "gazing direction," the description thereof is omitted.

TABLE 8

Distribution History DB

| Image Cookie | Image ID | Display Pattern used for Distribution | Clicking (Yes/No) |
| --- | --- | --- | --- |
| 12AB | G001-1 | P001 | NO |
| 34CD | G001-1 | P002 | NO |
| — | — | — | — |

Table 8 schematically illustrates information registered in the distribution history DB 191. The distribution history DB 191 registers, for example, image cookie, image ID, and display pattern of the full-view spherical image 6 (or 3DCG) distributed by being associated with the image cookie, and clicking (yes/no). If the image cookie is registered in the terminal apparatus 30 when the image distribution apparatus 10 transmits the advertisement data, the image distribution apparatus 10 can acquire the image cookie from the terminal apparatus 30. With this configuration, the image distribution apparatus 10 can prevent the distribution of the same full-view spherical image 6 (and/or 3DCG) to the same viewer person, or prevent the same full-view spherical image 6 (and/or 3DCG) from being distributed using the same display pattern. Further, the image distribution apparatus 10 can perform the retargeting distribution.

Function of History Management Server

The image information response unit 11 assigns the advertisement opportunity ID to the DSP cookie, the advertiser ID, and the request content (mainly the advertisement frame ID) acquired from the DSP 20, and transmits the advertisement opportunity ID to the DSP 20 together with the access information a2. Each advertisement frame 7 of the terminal apparatus 30 can be identified using the advertisement opportunity ID. The image information response unit 11 is implemented by executing the program 209$p$ using the CPU 201 of FIG. 4.

When the advertisement data is requested from the terminal apparatus 30 together with the advertisement opportunity ID, the advertisement distribution unit 12 determines the to-be-distributed full-view spherical image 6 (and/or 3DCG) and the display pattern of the to-be-distributed full-view spherical image 6 (and/or 3DCG). First, the advertisement distribution unit 12 determines the full-view spherical image 6 (and/or 3DCG) associated with the advertiser ID, acquired from the DSP 20, by referring to the advertisement image DB 194. The advertisement distribution unit 12 preferably uses the attribute of viewer persons. The attribute of viewer persons may be notified from the DSP 20 to the image distribution apparatus 10, or the image distribution apparatus 10 may store the attribute of viewer persons in association with the image cookie.

Then, the advertisement distribution unit 12 refers to the pattern DB 195 to determine a display pattern of the full-view spherical image 6 (and/or 3DCG). For example, the advertisement distribution unit 12 determines one display pattern having the highest number of times of clicking operation, or determines one display pattern having the number of times of clicking operation that is equal to a threshold or more, from a plurality of the display patterns. It is preferable that the advertisement distribution unit 12 uses the attribute of viewer persons when determining the display pattern. The advertisement distribution unit 12 is implemented by executing the program 209$p$ and controlling the network driver 205 using the CPU 201 of FIG. 4.

The operation history acquiring unit 14 acquires the operation history information from the terminal apparatus 30 together with the image cookie and the image ID, and sets the operation history information in the operation history DB 192. The operation history information includes, for example, two types of the operation history information, such as one operation history information for determining the gazing regions and the angle of view of the gazing regions (or target gazing direction and the size (e.g., pixel numbers of vertical direction and horizontal direction)), and another operation history information used for updating the clicked number (clicked operation). The operation history acquiring unit 14 is implemented by executing the program 209 $p$ and controlling the network driver 205 using the CPU 201 of FIG. 4.

Further, the operation history recording unit 41 of the terminal apparatus 30 can be allocated in the image distribution apparatus 10. The operation history recording unit 41 requires operated contents in time series. If the operation history recording unit 41 is allocated in the terminal apparatus 30, the image distribution apparatus 10 may not acquire the operation history information effectively depending on communication conditions, such as communication bandwidth capacity. By contrast, if the operation history recording unit 41 is allocated in the image distribution apparatus 10, the operation history transmitting unit 42 of the terminal apparatus 30 can be configured to transmit the latest operation history information alone to the image distribution apparatus 10, with which the communication load between the terminal apparatus 30 and the image distribution apparatus 10 can be reduced.

The gazing target determination unit 13 determines a gazing region A of the full-view spherical image 6. The gazing region A is an example of the gazing target.

The gazing target determination unit 13 determines the gazing region A using a method to be described later. The gazing target determination unit 13 registers a display pattern using the determined gazing region A in the pattern DB 195. The gazing target determination unit 13 is implemented by executing the program 209$p$ using the CPU 201 of FIG. 4. Further, the gazing target determination unit 13 determines a target gazing direction of the 3DCG image. Various methods can be used for determining the target gazing direction, which will be described later. The gazing target determination unit 13 registers a display pattern using the determined target gazing direction in the pattern DB 195.

Determination of Gazing Region

Method of Determining Gazing Region from Feature Value

Figure 10:
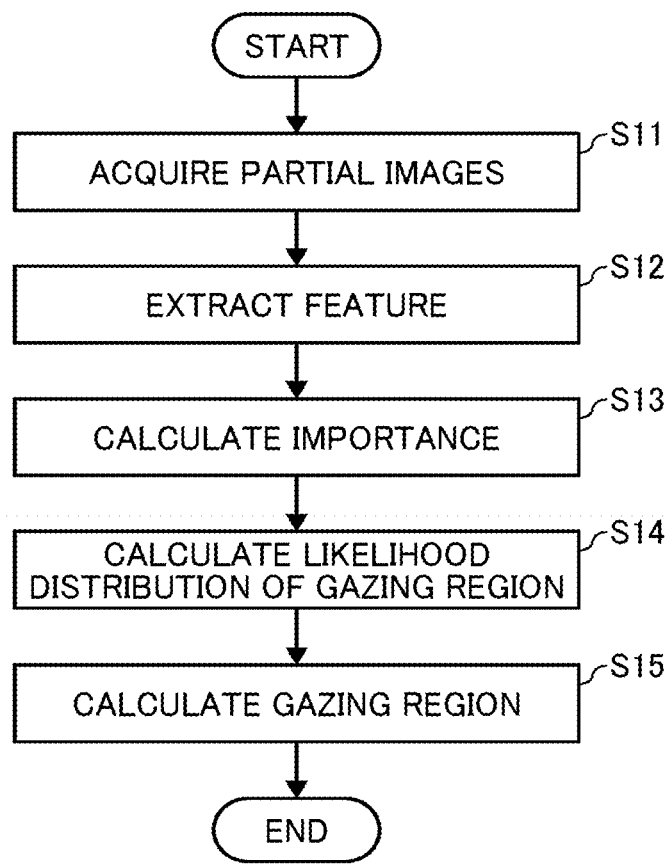
FIG. 10 is an example flowchart illustrating operation of determining a gazing region using a gazing target determination unit, according to an embodiment of the present disclosure.

FIG. 10 is an example of a flowchart illustrating the steps of determining the gazing region A using the gazing target determination unit 13.

Figure 11A:
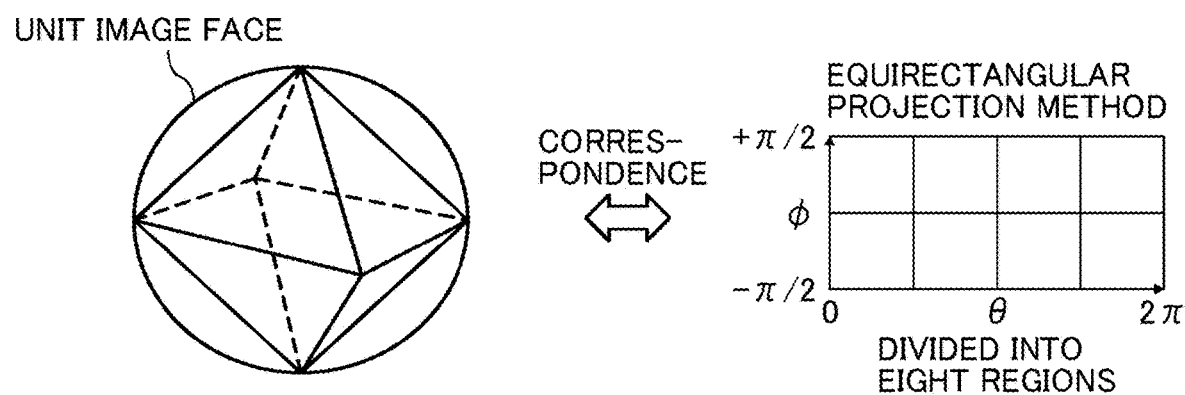
FIG. 11A illustrates an example of defining a regular octahedron as a projection plane of a full-view spherical image, according to an embodiment of the present disclosure.
Figure 11B:
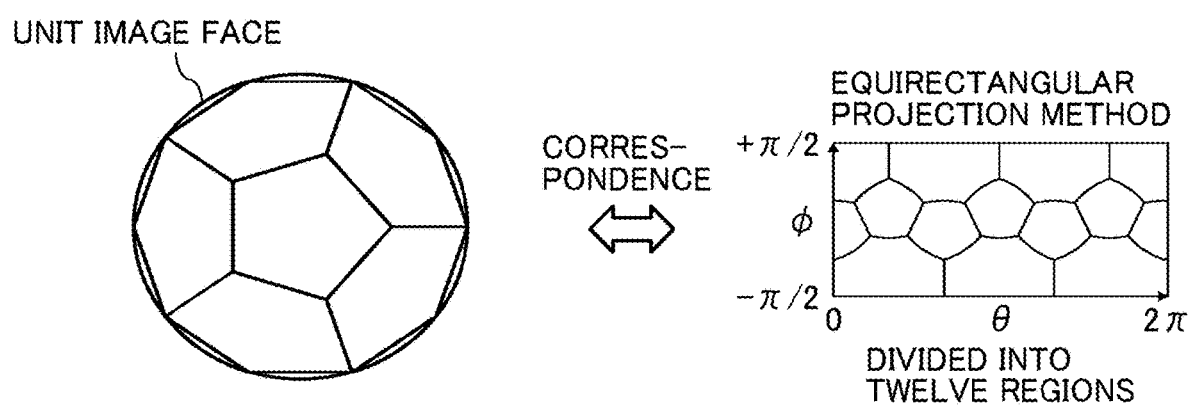
FIG. 11B illustrates an example of defining a regular dodecahedron as a projection plane of a full-view spherical image, according to an embodiment of the present disclosure.

In step S11, the gazing target determination unit 13 defines a normal polyhedron having the center that is common to a unit sphere, and performs a perspective projection conversion using a normal direction of each face as the line of sight direction to acquire a plurality of partial images. FIG. 11A illustrates an example of defining a regular octahedron as a projection plane of the full-view spherical image 6. FIG. 11B illustrates an example of defining a regular dodecahedron as a projection plane of the full-view spherical image 6.

In step S12, the gazing target determination unit 13 extracts a feature from each of the partial images acquired in step S101. Since an input image is divided by the above-described method and the feature is calculated from the partial image having lesser distortion, a wide-angle image exceeding 180 degrees can be processed robustly. The feature includes, for example, color, edge, conspicuity (prominence), and object position/label.

In step S13, the gazing target determination unit 13 calculates importance of each position (each pixel) of the input image based on the feature extracted from each partial image using any known regression model. Although the detail of the regression model is omitted, the importance and feature for each position can be expressed by a regression function. Further, the importance "g" that is the output (teacher data) is determined in advance by using training data, and the relationship between the feature and the importance "g" is determined in advance.

In step S14, the gazing target determination unit 13 calculates a likelihood distribution of the gazing region A based on a distribution of the importance calculated in step S13 under a design concept that the gazing region A of the user exists in the direction corresponding to the higher importance. For example, after a region R passing through the viewpoint is defined on the unit image face, the gazing target determination unit 13 adds the importance value of each position in the region R to obtain the added value as the likelihood distribution of the gazing region A.

In step S15, the gazing target determination unit 13 calculates the gazing region A based on the likelihood distribution of the gazing region A calculated in step S14. In the embodiment, for example, a position corresponding to the image capturing direction corresponding to the maximum likelihood value of the likelihood distribution of the gazing region is calculated as the gazing region A.

By performing the above described processing, some gazing regions A can be calculated. The gazing target determination unit 13 identifies a pre-set number of gazing regions A, or the gazing region A having a value equal to a threshold or more from the number "N" (N: natural integer) of the gazing region A. Then, a display pattern combining the displaying sequence and the angle of view of the gazing region A is registered in the pattern DB 195. Since the calculation of the target gazing direction and the size (e.g., pixel numbers of vertical direction and horizontal direction) are performed in the same manner, the description thereof will be omitted.

Determining Person as Gazing Region

A person can be considered as a target object to attract an attention of a viewer person. The person can be detected using any known method, such as the facial recognition method. The facial recognition method can use any known methods that perform the pattern matching by detecting histogram of oriented gradients (HOG) feature or Haar-like feature. The gazing target determination unit 13 detects the center of the person's face as the gazing region A. If the number of faces is large, the number of faces may be reduced by assuming that the faces within the closer distance as one face.

Determining Smiling Face as Gazing Region

Human smile can be considered as a target object to attract an attention of a viewer person. A method of detecting a smiling face may include the facial recognition described above, and any known method performing the pattern matching using patterns of smiling face stored in advance. If the number of faces is large, the smiling face alone may be set as the gazing region A. Further to smiling face, faces such as grief, anger, anger, and embarrassment may be determined as the gazing region A.

Determining Child as Gazing Region

When a child is present among adults, the child can be considered as a target object to attract an attention of a viewer person. Alternatively, when an adult is present among many children, the adult can be considered as a target object to attract an attention of a viewer person. The position of face can be used to detect the child or adult. If the position of face identified by the facial recognition is lower than the position of the other faces, it is estimated that the identified face is for the child, and if the position of face identified by the facial recognition is higher than the position of the other faces, it is estimated that the identified face is for the adult.

Determining Object as Gazing Region

It can be assumed that each advertiser is aware of the gazing region A that each advertiser wants viewer persons to see. Therefore, a target object designated by the advertiser can be detected by the gazing target determination unit 13 and set as the gazing region A. For example, products or services of advertisers, such as automobiles, furniture, foods, or the like, can be detected by performing the pattern recognition and set as the gazing region A.

Use of Operation History

When a child is present among adults, the child can be considered as a target object to attract an attention of a viewer person. Alternatively, when an adult is present among many children, the adult can be considered as a target object to attract an attention of a viewer person. The position of face can be used to detect the child or adult. If the position of face identified by the facial recognition is lower than the position of the other faces, it is estimated that the identified face is for the child, and if the position of face identified by the facial recognition is higher than the position of the other faces, it is estimated that the identified face is for the adult. If a clicking operation is performed, the angle of view at the time of clicking operation can be set as the gazing region A.

Information Used by Web Page

Figure 12A:
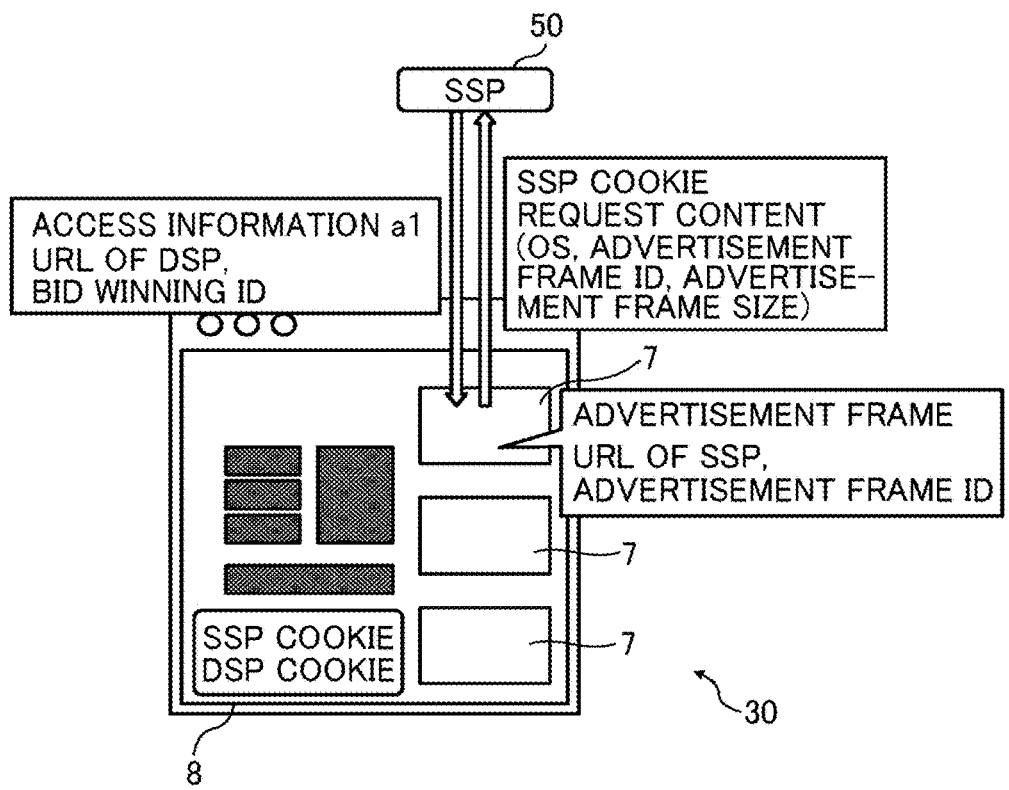
FIGS. 12A, 12B and 12C (FIG. 12) are examples of schematic diagram describing information used for a web page, according to an embodiment of the present disclosure.
Figure 12B:
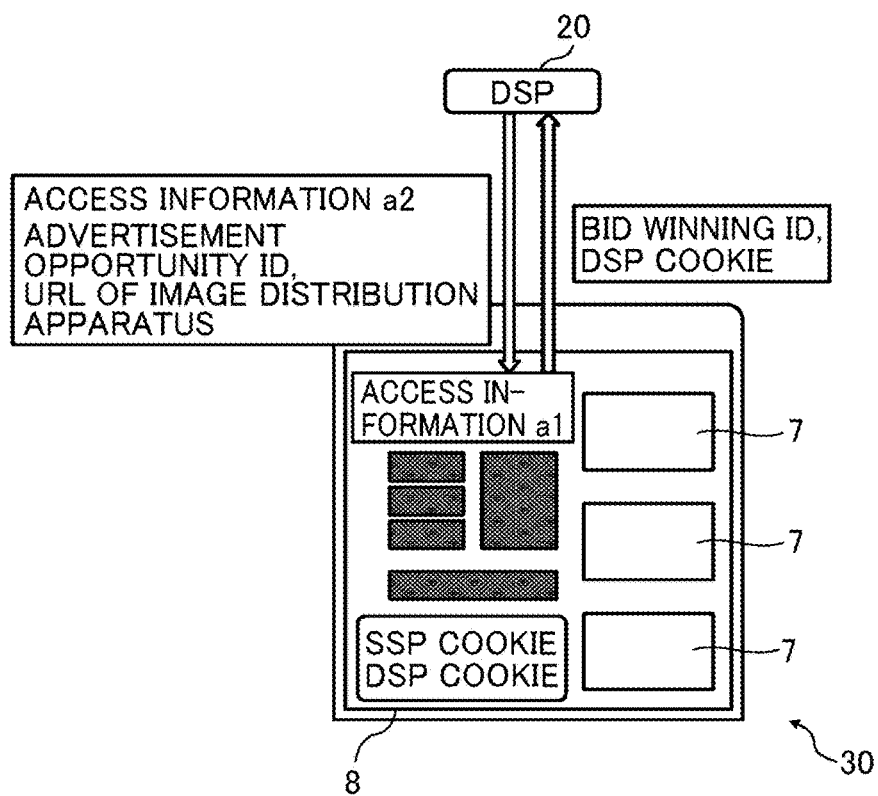
Figure 12C:
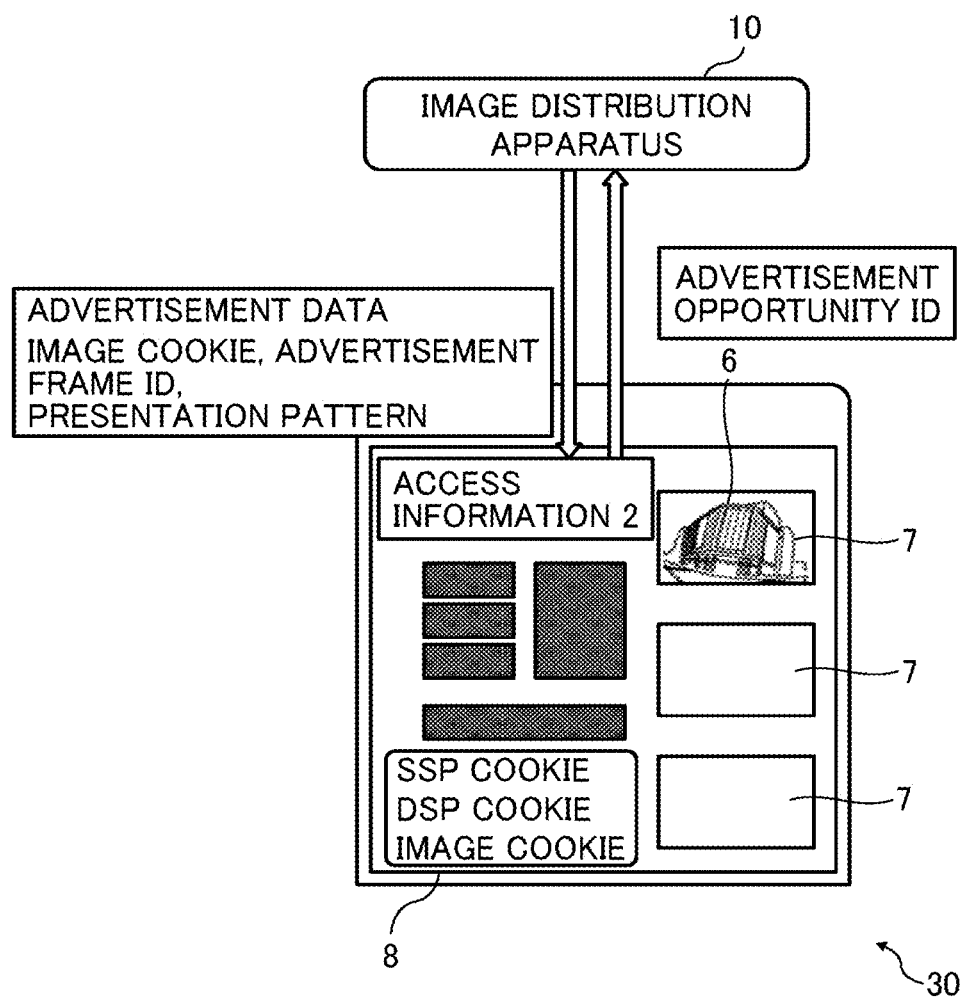

FIGS. 12A, 12B, and 12C (FIG. 12) are examples of a schematic diagram describing information used by a web page. FIG. 12A is an example of a web page provided by the partner site web server 60. The web page provided by the partner site web server 60 includes one or more advertisement frames 7. Further, the terminal apparatus 30 stores the SSP cookie and the DSP cookie in advance. The advertisement frame 7 is associated, for example, with the URL of the SSP 50 and the advertisement frame ID. The browser (e.g., advertisement frame detection unit 36) of the terminal apparatus 30 transmits the SSP cookie and the request content to the SSP 50. Further, the SSP 50 transmits the access information a1 including the URL of the DSP 20, which won the advertisement frame 7 by the bidding, and the bid winning ID to the terminal apparatus 30.

FIG. 12B illustrates an example of operation using the access information a1. The access information a1 is used to transmit the bid winning ID and the DSP cookie to the DSP 20 to the DSP 20 based on the URL of the DSP 20. The DSP 20 identifies the advertisement request using the bid winning ID, and acquires the access information a2 including the URL of the image distribution apparatus 10, and the advertisement opportunity ID from the image distribution apparatus 10. The terminal apparatus 30 acquires the access information a2 and the advertisement opportunity ID from the DSP 20.

FIG. 12C illustrates an example of operation using the access information a2. The access information a2 is used to transmit the advertisement opportunity ID to the image distribution apparatus 10 based on the URL of the image distribution apparatus 10. The image distribution apparatus 10 generates the advertisement data based on the advertisement request identified by the advertisement opportunity ID, and transmits the advertisement data to the terminal apparatus 30 together with the image cookie, the advertisement frame ID, and the display pattern. With this configuration, the full-view spherical image 6 is displayed on the advertisement frame 7 set on the web page.

Distribution Procedure

Figure 13:
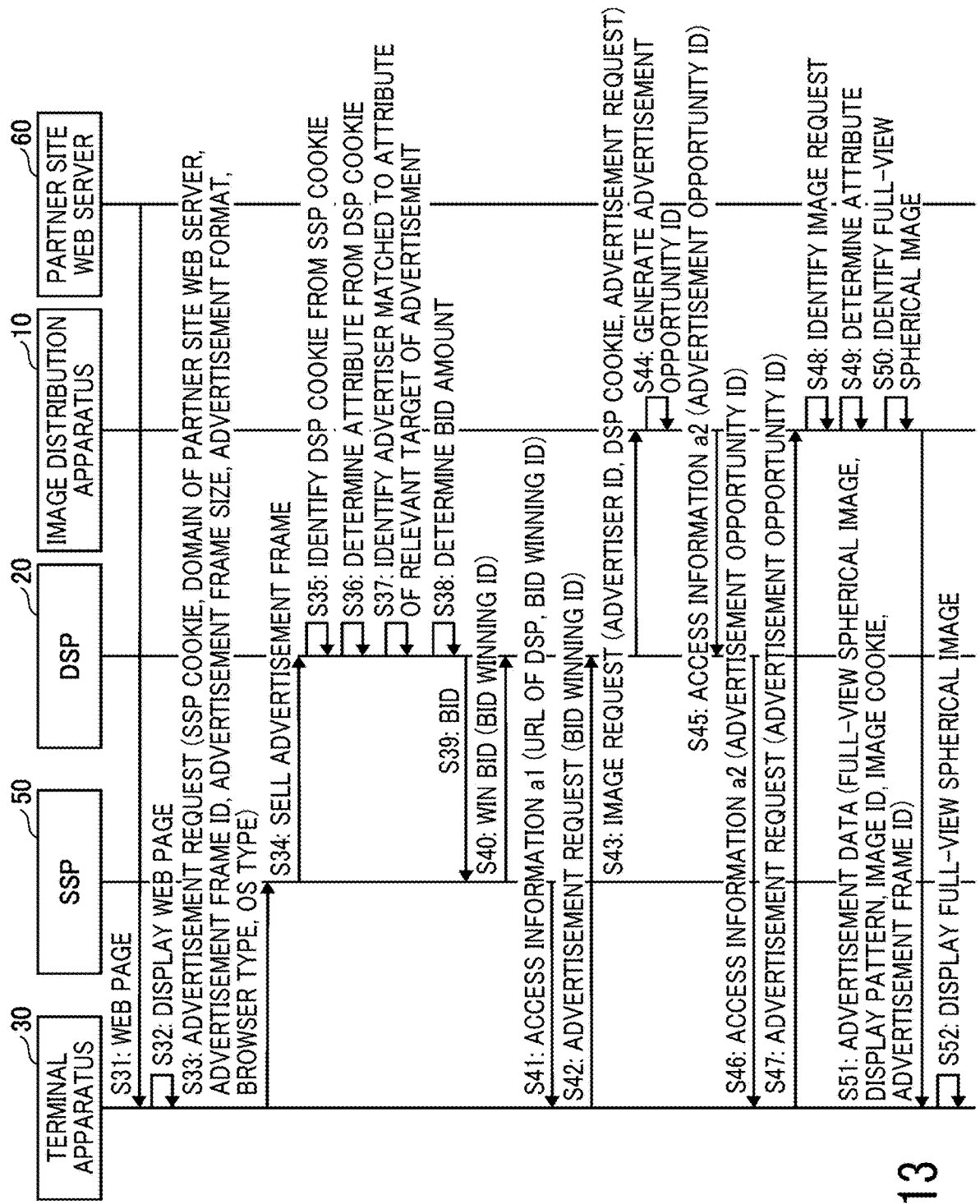
FIG. 13 is an example sequence diagram illustrating operation of distributing a full-view spherical image, displayed as an advertisement, in the browsing system of FIG. 2, according to an embodiment of the present disclosure.

FIG. 13 is an example of a sequence diagram illustrating the steps of distributing the full-view spherical image 6, displayed as the advertisement, in the browsing system 100.

S31: At first, a viewer person operates the terminal apparatus 30 to connect the terminal apparatus 30 and the partner site web server 60. After the operation reception unit 34 of the terminal apparatus 30 receives an operation of the viewer person, the web page acquiring unit 31 acquires a web page from the partner site web server 60.

S32: The web page analyzing unit 32 of the terminal apparatus 30 analyzes the web page, extracts HTML, CSS and script, and then the web page display unit 33 displays the web page based on the extracted HTML and CSS.

S33: The advertisement frame detection unit 36 of the terminal apparatus 30 transmits an advertisement request to the SSP 50 by executing an advertisement tag (e.g., script) associated with the advertisement frame 7. The advertisement request includes, for example, an SSP cookie, a domain of the partner site web server 60, an advertisement frame ID, an advertisement frame size, an advertisement format, a browser type, and an OS type.

S34: After the advertisement request acquiring unit 52 of the SSP 50 acquires the advertisement request, the advertisement requesting unit 51 receives the advertisement request. Then, the advertisement requesting unit 51 detects the SSP cookie, and notifies the advertisement request to the DSP 20 to sell the advertisement frame 7.

S35: The request receiving unit 21 of the DSP 20 transmits the advertisement request to the bidding determination unit 22. Then, the bidding determination unit 22 of the DSP 20 refers to the cookie information DB 291 to identify the DSP cookie from the SSP cookie.

S36: The bidding determination unit 22 determines attribute from the DSP cookie. The bidding determination unit 22 may refer to the visiting domain of the cookie information DB 291, or the attribute information of viewer person identified by the DSP cookie as needed.

S37: The bidding determination unit 22 refers to the distribution setting DB 292 to determine whether to transmit a wide-angle image to the viewer person based on a least any one the attribute of relevant target (or preferred target) and the attribute of irrelevant target (or non-preferred target) set for the provider that provides the wide-angle image. In this case, it is assumed that the bidding determination unit 22 determines to distribute the wide-angle image provided by at least one advertiser.

S38: The bidding determination unit 22 determines the bid amount in accordance with the advertiser's budget and the matching level of the attribute.

S39: The bidding unit 23 of the DSP 20 bids the SSP 50. Typically, the bid winning unit 54 of the SSP 50 determines the DSP 20 offering the highest bid amount for the bidding from the plurality of DSPs 20 as the winning bidder.

S40: It is assumed that the DSP 20 in FIG. 13 won the bidding. The SSP 50 notifies the bid winning ID to the DSP 20.

S41: The access information transmitting unit 53 of the SSP 50 transmits the access information a1 to the terminal apparatus 30 together with the bid winning ID.

S42: The advertisement requesting unit 38 of the terminal apparatus 30 executes the access information a1 to transmit the advertisement request to the DSP 20 together with the bid winning ID.

S43: The advertisement request receiving unit 24 of the DSP 20 identifies the advertisement request based on the bid winning ID. The image requesting unit 25 requests an image to the image distribution apparatus 10 together with the advertiser ID, the DSP cookie, and the advertisement request.

S44: After the image information response unit 11 of the image distribution apparatus 10 receives the image request, the image information response unit 11 generates an advertisement opportunity ID identifying the advertisement request.

S45: The image information response unit 11 transmits the access information a2 associated with the advertisement opportunity ID to the DSP 20.

S46: After the image requesting unit 25 of the DSP 20 receives the access information a2 and the advertisement opportunity ID, the advertisement request receiving unit 24 transmits the advertisement request to the terminal apparatus 30.

S47: The advertisement acquiring unit 39 of the terminal apparatus 30 transmits the advertisement request (including the advertisement opportunity ID) to the image distribution apparatus 10 based on the URL of the image distribution apparatus 10 included in the access information as2. If the terminal apparatus 30 stores the image cookie, the terminal apparatus 30 can transmit the image cookie to the image distribution apparatus 10.

S48: The advertisement distribution unit 12 of the image distribution apparatus 10 identifies an image request based on the advertisement opportunity ID.

S49: The advertisement distribution unit 12 determines the attribute from the DSP cookie and/or determines the attribute from the image cookie.

S50: The advertisement distribution unit 12 identifies the full-view spherical image 6 based on the advertiser ID and the attribute. That is, the advertisement distribution unit 12 refers to the advertisement image DB 194 to determine the to-be-transmitted full-view spherical image 6 based on the attribute or priority associated with the target person set for distributing the full-view spherical image 6. The display pattern having the number of times of clicking operation higher than a threshold may be used as the display pattern. However, the display patterns may be selected randomly while the number of times of distribution of the full-view spherical image 6 is still small.

S51: The advertisement distribution unit 12 transmits advertisement data including the full-view spherical image 6, the display pattern, the image ID, the image cookie, and the advertisement frame ID to the terminal apparatus 30. Further, the full-view spherical image 6 is associated with the URL of the advertiser web server 70.

Figure 14:
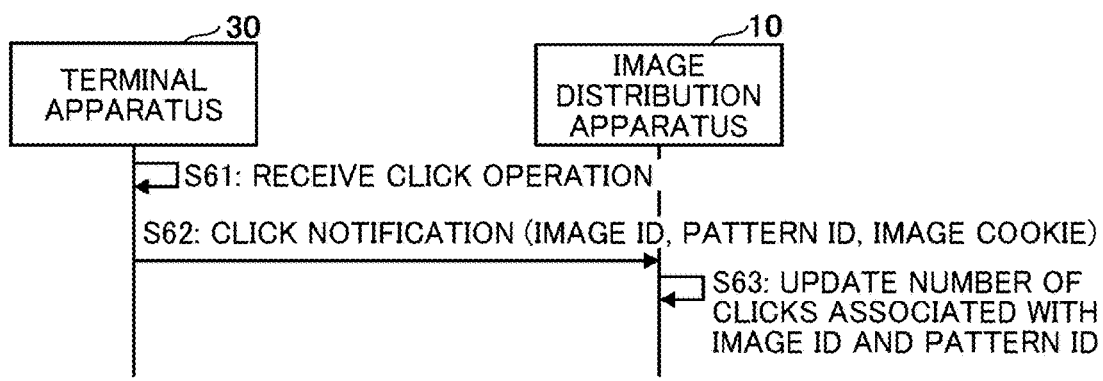
FIG. 14 is an example sequence diagram illustrating operation of updating the number of times of clicking operation for each display pattern using an image distribution apparatus, according to an embodiment of the present disclosure.

S52: After the advertisement acquiring unit 39 of the terminal apparatus 30 acquires the advertisement data, the advertisement display unit 40 displays the full-view spherical image 6 on the advertisement frame 7. If the viewer person clicks the advertisement frame 7, the operation reception unit 34 receives the clicking operation, and then the web page acquiring unit 31 starts to communicate with the advertiser web server 70. In a case of 3DCG too, the same processing of the full-view spherical image 6 (S32 to S52) is performed, and thereby the description thereof is omitted. Updating of Number of Times of Clicking Operation for Each Display Pattern:

FIG. 14 is an example of a sequence diagram illustrating the steps of updating the number of times of clicking operation for each display pattern using the image distribution apparatus 10.

S61: When a viewer person sees the full-view spherical image 6 on the advertisement frame 7 rotating in accordance with the display pattern, the viewer person clicks or taps the advertisement frame 7 if the viewer person is interested in the advertisement. The operation reception unit 34 of the terminal apparatus 30 receives a clicking operation performed by the viewer person.

S62: The operation history recording unit 41 records the clicking operation, and the operation history transmitting unit 42 transmits a notification of the clicking operation to the image distribution apparatus 10. The transmission of notification of the clicking operation may be performed right after the clicking or when communication load is lower. The notification of clicking operation includes, for example, the image ID, the pattern ID, and the image cookie. The image cookie can be used to record the number of times of clicking operation for each attribute.

S63: After the operation history acquiring unit 14 of the image distribution apparatus 10 acquires information that the clicking operation was performed, the operation history acquiring unit 14 increases the number of times of clicking operation associated with the image ID and the pattern ID in the pattern DB 195 by one (i.e., update the number of times of clicking operation). Alternatively, the operation history acquiring unit 14 determines the attribute based on the image cookie, and then increases the number of times of clicking operation for each attribute.

With this processing, the number of times of clicking operation is accumulated for each display pattern, and the number of times of clicking operation of a specific display pattern that can be easily clicked is increased. In other words, a specific display pattern that is less likely to be clicked becomes obvious. In a case of 3DCG, the same processing (S61 to S63) of the full-view spherical image 6 is performed, and therefore the description thereof is omitted.

Displaying Based on Display Pattern

Figure 15A:
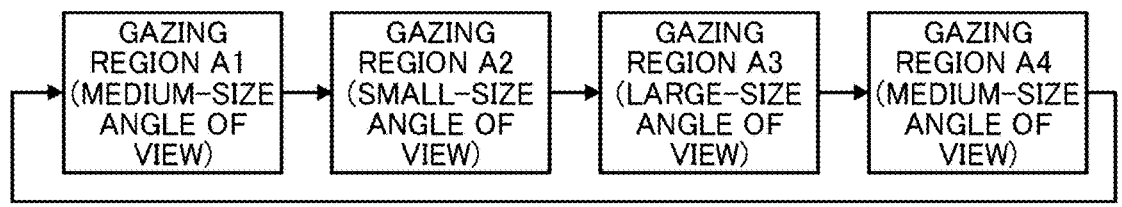
FIGS. 15A and 15B (FIG. 15) schematically illustrate a displaying of gazing regions using a display pattern, according to an embodiment of the present disclosure.
Figure 15B:
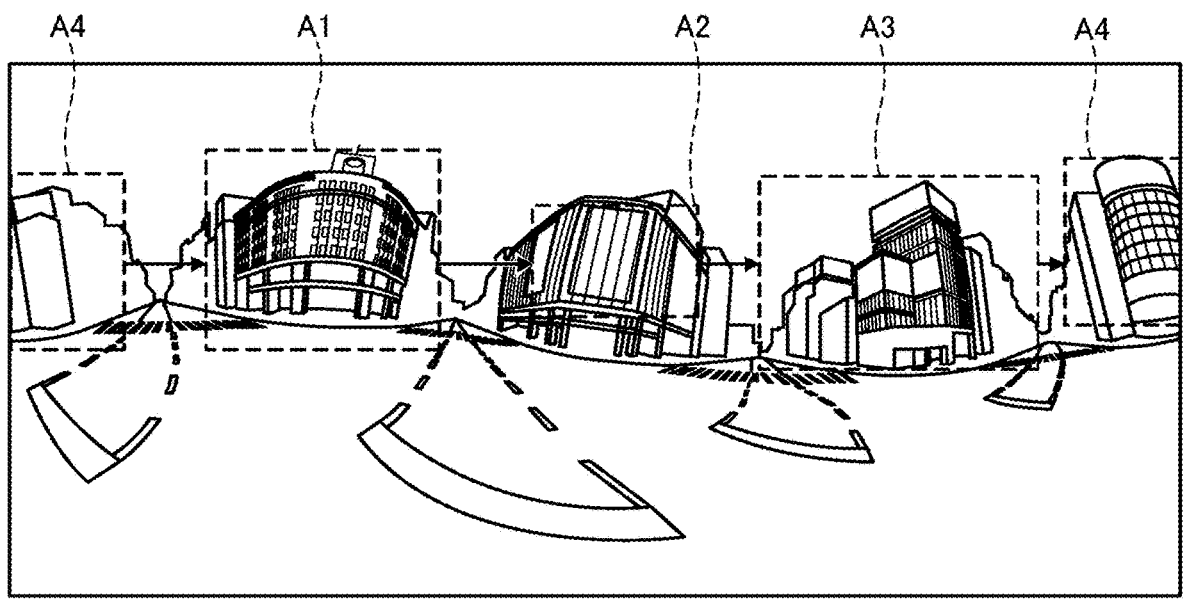

FIGS. 15A and 15B (FIG. 15) schematically illustrates a displaying of the gazing region A using a display pattern. FIG. 15A illustrates an example of a display pattern. FIG. 15B illustrates an example of the gazing region A and the angle of view in the full-view spherical image 6.

The display pattern illustrated in FIG. 15A is included in the advertisement data. Based on the display pattern included in the advertisement data, the advertisement display unit 40 displays the gazing region A1 with a medium-size angle of view, the gazing region A2 with a small-size angle of view, the gazing region A3 with a large-size angle of view, and the gazing region A4 with a medium-size angle of view with a displaying sequence. After the gazing region A4 is displayed, the display image returns to the gazing region A1 as illustrated in FIG. 15A.

Specifically, as illustrated in FIG. 15B, the gazing regions A1 to A4 (corresponding to specific regions T) set within the full-view spherical image 6 shift one to another, such as successively shifting one to another. The gazing regions A1 to A4 (corresponding to specific regions T) are displayed on the advertisement frame 7. The advertisement display unit 40 can displays the gazing regions A1 to A4 (corresponding to specific regions T) one to another using the displaying sequence while displaying the full-view spherical image 6.

Since the size of the advertisement frame 7 does not change, the viewer person may recognize that the image displayed on the advertisement frame 7 is enlarged when the gazing region A1 shifts to the gazing region A2; the image displayed on the advertisement frame 7 is reduced when the gazing region A2 shifts to the gazing region A3; the image displayed on the advertisement frame 7 is enlarged when the gazing region S3 shifts to the gazing region A4; and the image displayed on the advertisement frame 7 is not enlarged or reduced when the gazing region A4 shifts to the gazing region A1.

As described above, since the terminal apparatus 30 constantly displays the full-view spherical image 6 by automatically tracking the plurality of gazing region A sequentially, the characteristic portions of the full-view spherical image 6 can be browsed by the viewer person even when the viewer person does not operate the full-view spherical image 6.

Figure 16A:
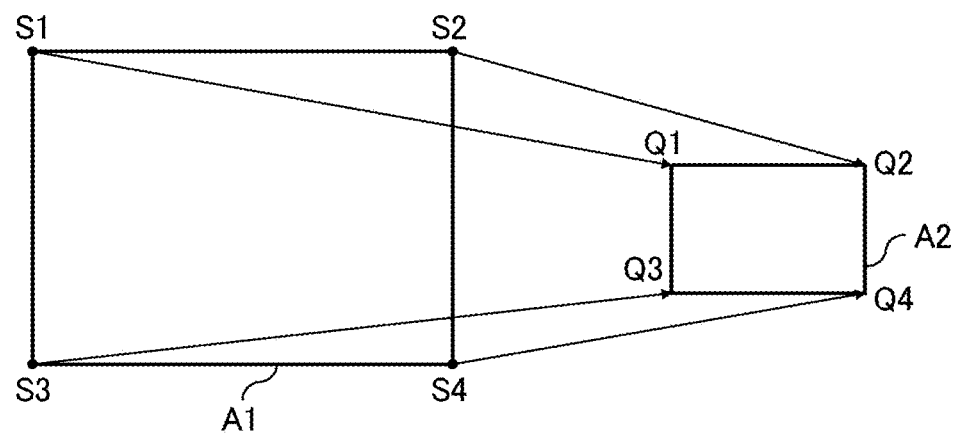
FIGS. 16A and 16B (FIG. 16) schematically illustrate examples of describing enlargement and reduction of an image, according to an embodiment of the present disclosure.
Figure 16B:
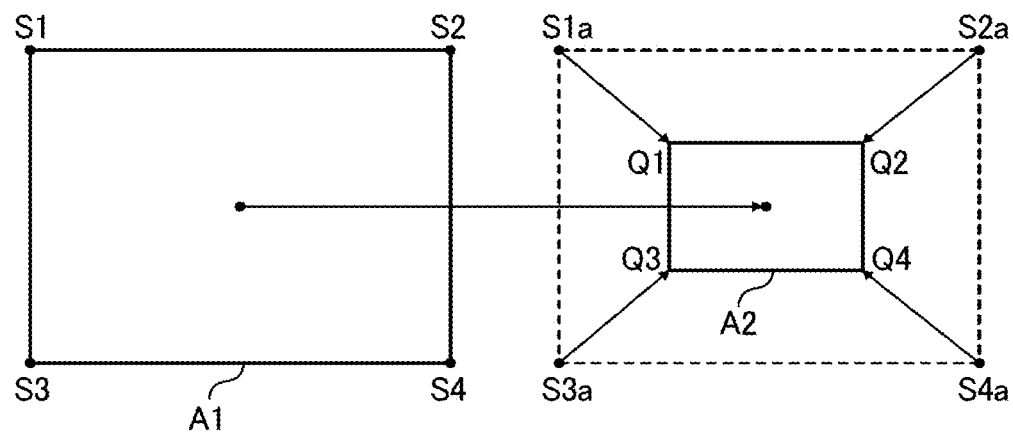

FIGS. 16A and 16B (FIG. 16) schematically illustrate examples of diagrams describing enlargement and reduction of an image. FIG. 16A illustrates a display method of enlarging and shifting of the display region concurrently. FIG. 16B illustrates a display method of enlarging the display area after shifting the display region. Since the angle of view is reduced by shifting from one display region to another display region, FIG. 16 indicates a case of the enlargement of image, but a case of the reduction of image can be similarly performed.

Hereinafter, a description is given of the display method of FIG. 16A. The advertisement display unit 40 identifies four vertices S1 to S4 when the gazing region A1 having the medium-size angle of view is used. The coordinates of four vertices Q1 to Q4 corresponding to the gazing region A2 having the small-size angle of view can be calculated. Then, each of curve lines on a sphere connecting S1 and Q1, S2 and Q2, S3 and Q3, and S4 and Q4 (on the spherical surface of entire celestial sphere) are divided (interpolated) into a given number of lines, and then the terminal apparatus 30 displays the full-view spherical image 6 using coordinates and angle of view at each of the divided points. With this processing, the full-view spherical image 6 can be displayed while smoothly shifting from one display region to another display region and reducing a size of the display region, and displaying the gazing region A with a specific angle of view.

Hereinafter, a description is given of the display method of FIG. 16B. The advertisement display unit 40 identifies four vertices S1 to S4 when the gazing region A1 having the medium-size angle of view is used. The coordinates of four vertices Q1 to Q4 corresponding to the gazing region A2 having the small-size angle of view can be calculated. Then, each of curve lines on a sphere connecting S1 and S1a, S2 and S2a, S3 and S3a, and S4 and S4a (on the spherical surface of entire celestial sphere) are divided (interpolated) into a given number of lines, and the terminal apparatus 30 displays the full-view spherical image 6 using coordinates and angle of view (constant) at each of the divided points.

Then, the advertisement display unit 40 divides each of curve lines on a sphere connecting S1a and Q1, S2a and Q2, S3a and Q3, and S4a and Q4 into a given number of lines, and the terminal apparatus 30 displays the full-view spherical image 6 using coordinates and angle of view at each of the divided points. With this processing, one display region set for the full-view spherical image 6 smoothly shifts to another display region set for the full-view spherical image 6, and then the image in the display region 2 can be enlarged and displayed using the determined angle of view.

The full-view spherical image 6 can be displayed using any one of the above described display methods in view of enhancing of appealing of advertisement, and the display method can be set in advance in the image distribution apparatus 10. Alternatively, the number of times of clicking operation may be counted for the two display methods used as the display patterns, and the display method having the higher number of times of clicking operation may be used.

Still Time and Shift Speed

Figure 17A:
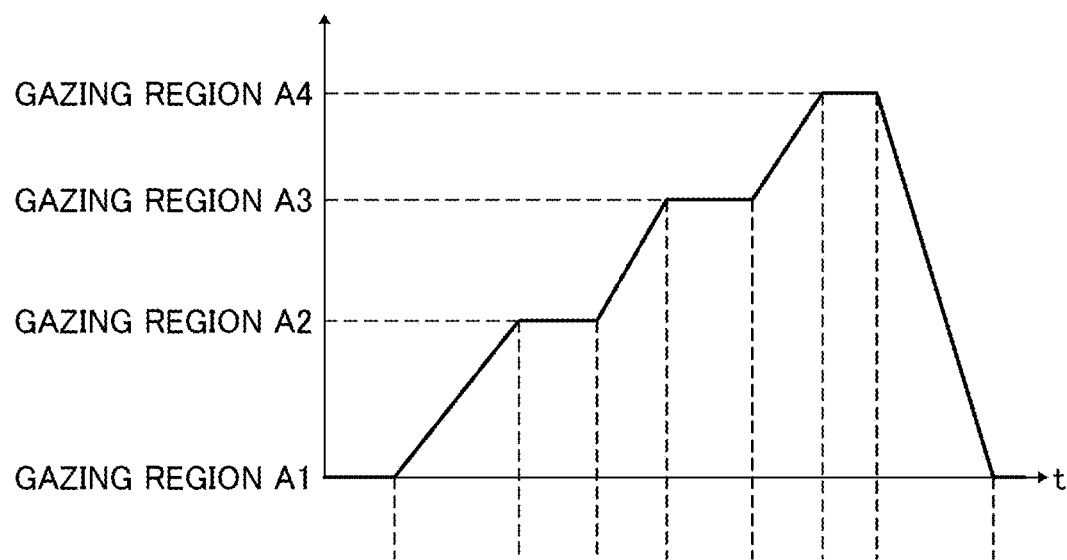
FIGS. 17A and 17B (FIG. 17) schematically illustrate examples of describing a shift amount and a shift speed between gazing regions along a time line, according to an embodiment of the present disclosure.
Figure 17B:
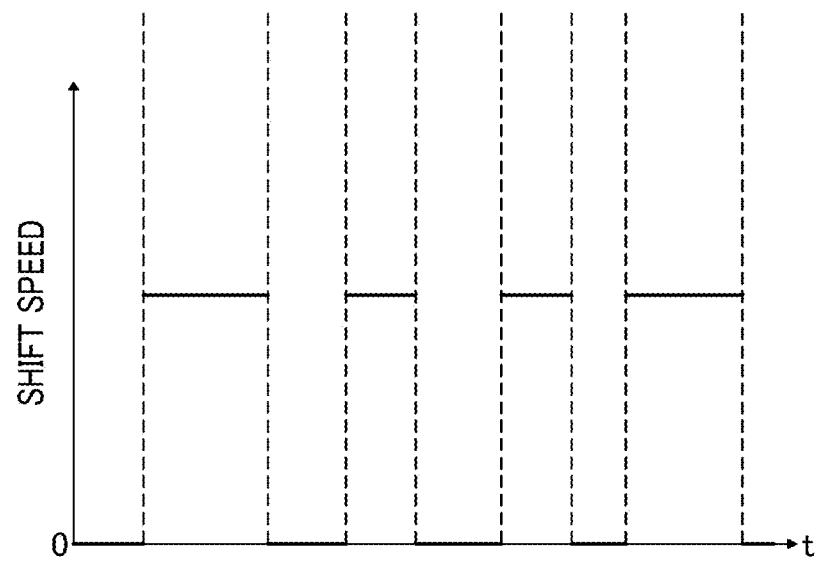

FIGS. 17A and 17B (FIG. 17) schematically illustrate examples of diagrams describing a shift amount and a shift speed between the gazing regions along a time line. FIG. 17A illustrates an example of a shift amount between the gazing regions. FIG. 17B illustrates an example of a shift speed. As illustrated in FIGS. 17A and 17B, the shifting of the display region is stopped at the gazing regions A1, A2, A3, and A4, and when the gazing region shifts from the gazing region A1 to the gazing region A2, from the gazing region A2 to the gazing region A3, and rom the gazing region A3 to the gazing region A4, the gazing region shifts at a constant speed. Since the display region remains stationary or stops for a given time period at each of the gazing regions A1, A2, A3, and A4, the viewer person can check each of the gazing region A. Information related to the shift speed may be stored in the pattern DB 195 in the image distribution apparatus 10, and the information related to the shift speed is transmitted to the terminal apparatus 30 from the image distribution apparatus 10.

The still time is, for example, a few seconds (e.g., one or two seconds). Further, the still time may be substantially zero. Further, if the display region is configured not to stop completely at each of the gazing regions A1, A2, A3, and A4 but slowly shifts from one region to next region, the display region is preferably configured to shift slowly between the gazing regions A1, A2, A3, and A4 so that the viewer person can check each of the gazing regions A1, A2, A3, and A4.

FIGS. 18A, 18B, 18C and 18D (FIG. 18) illustrate examples of diagrams of the shift speed from the gazing region A1 (one region) to the gazing region A2 (next region). The shifting between other two gazing regions A are similarly performed.

Figure 18A:
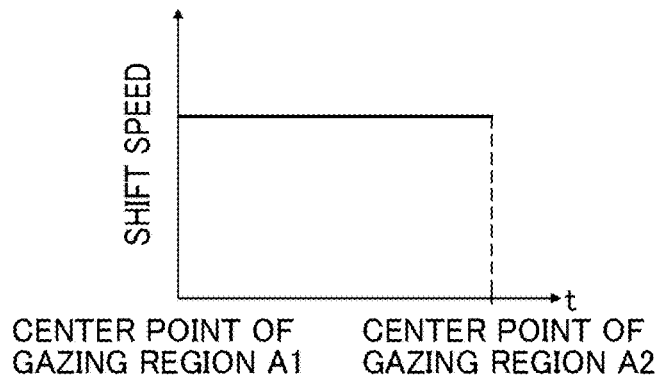
FIGS. 18A, 18B, 18C and 18D (FIG. 18) illustrate examples of a shift speed from one gazing region to another gazing region, according to an embodiment of the present disclosure.

FIG. 18A illustrates a method of shifting the display region from the gazing region A1 to the gazing region A2 at a constant shift speed using the terminal apparatus 30. That is, FIG. 18A is similar to FIG. 17. FIG. 18A indicates a case that the display region can be shifted at the highest shift speed.

Figure 18B:
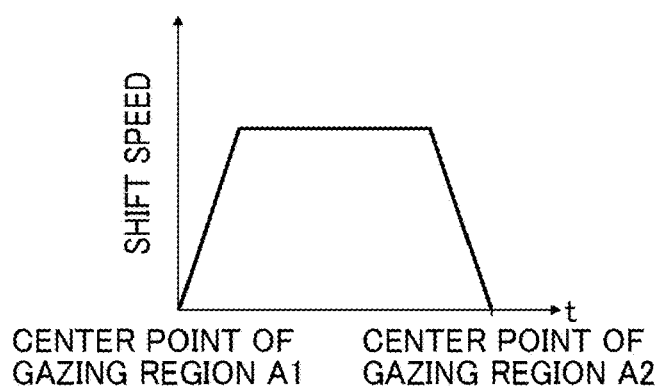

FIG. 18B illustrates another method of shifting the display region from the gazing region A1 to the gazing region A2, in which the shift speed gradually increases from the gazing region A1 that is at the shift start point, and then the shift speed becomes the constant, and then the shift speed gradually decreases before approaching the next gazing region A2. FIG. 18B indicates a case that the viewer person can easy to see the image because the abrupt shifting can be prevented.

Figure 18C:
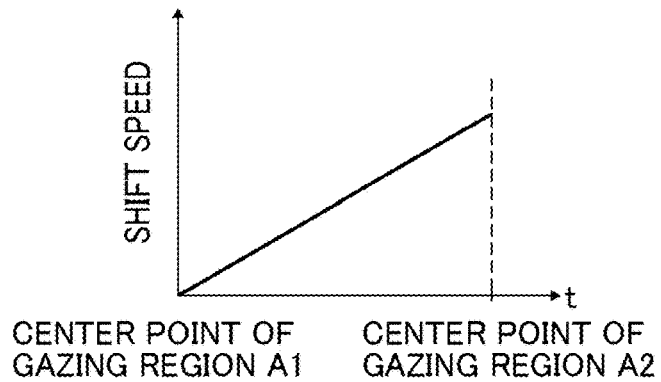

FIG. 18C illustrates another method of shifting the display region from the gazing region sA1 to the gazing region A2, in which the shift speed increases gradually from the gazing region A1 that is at the shift start point to the gazing region A2 that is at the shift end point. FIG. 18C indicates a case that abrupt shifting at the beginning of shifting can be prevented.

Figure 18D:
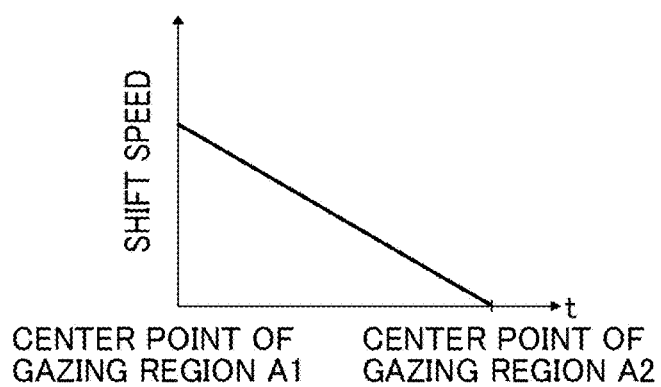

FIG. 18D illustrates another method of shifting the display region from the gazing region A1 to the gazing region A2, in which the shift speed gradually decreases from the gazing region A1 that is at the shift start point to the gazing region A2 that is at the shift end point. FIG. 18D indicates a case that the shift speed gradually decreases before t approaching the gazing region A2, in which the viewer person can see the next gazing region A with a longer period of time.

The method of shifting the display region that can enhance the appealing of advertisement is selected, and such method can be set in advance in the image distribution apparatus 10. Alternatively, the number of times of clicking operation may be counted for each of the methods of shifting the display region as the display pattern, and the method having the higher number of times of clicking operation may be used for shifting the display region.

Displaying Based Display Pattern

Figure 19:
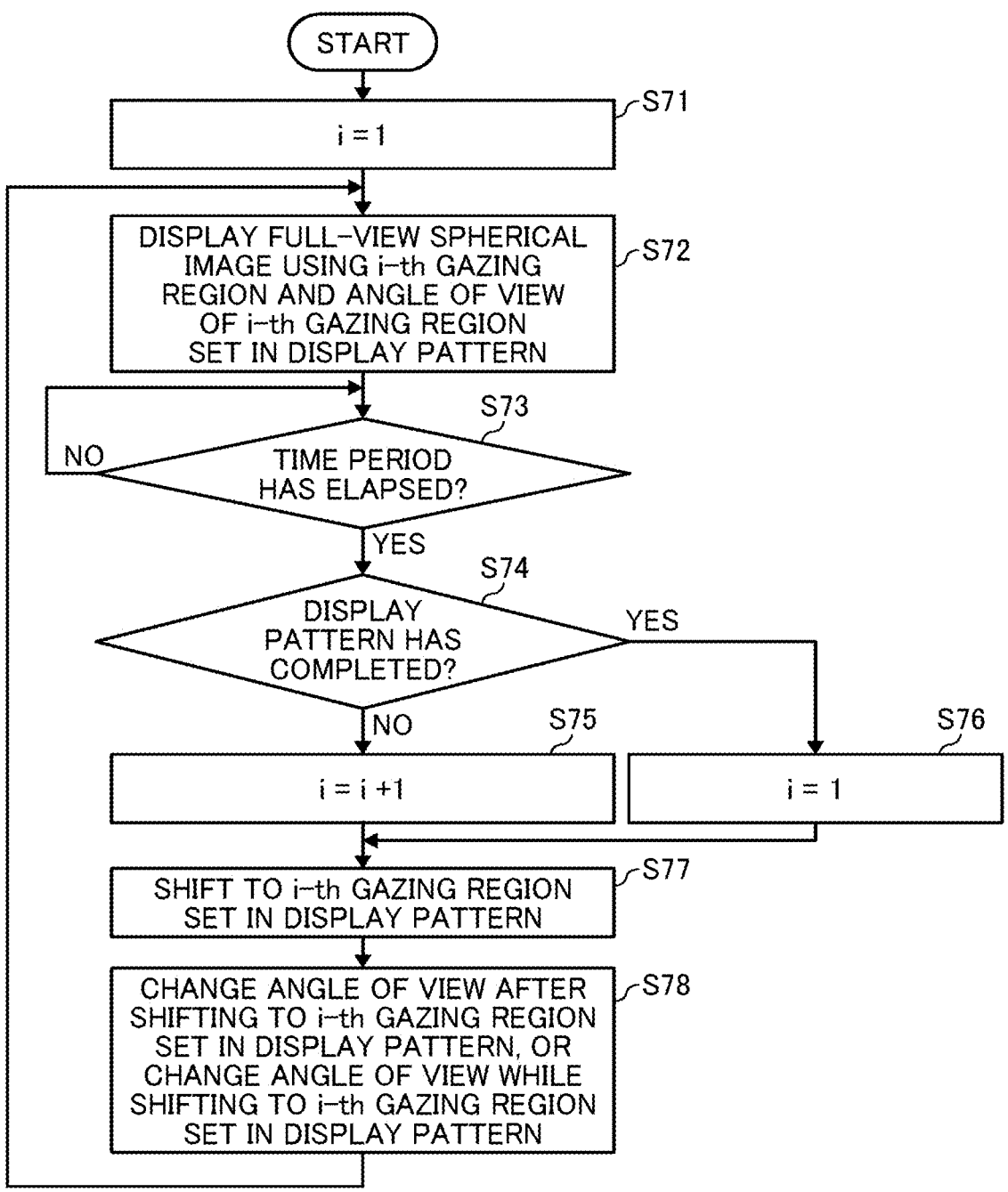
FIG. 19 is an example flowchart illustrating operation of displaying a full-view spherical image based a display pattern using an advertisement display unit, according to an embodiment of the present disclosure.

FIG. 19 is an example of a flowchart illustrating the steps of displaying the full-view spherical image 6 based a display pattern using the advertisement display unit 40. The sequence of FIG. 19 starts when the terminal apparatus 30 receives advertisement data.

At first, the advertisement display unit 40 sets "1" to "i" (S71). In this sequence, "i" indicates a displaying sequence of the gazing region A and the angle of view set for one display pattern.

Then, the advertisement display unit 40 displays the full-view spherical image 6 using the i-th gazing region and the angle of view of the i-th gazing region set in the display pattern (S72).

Then, the advertisement display unit 40 determines whether a given time period has elapsed since the start of displaying the full-view spherical image 6 (S73). For example, the given time period can be set to zero.

When the determination in step S73 is "YES," the advertisement display unit 40 determines whether the display pattern has completed (S74).

If the display pattern is completed (S74: YES), the advertisement display unit 40 sets "1" to "i", and displays the full-view spherical image 6 using the gazing region and the angle of view corresponding to the first gazing region set in the one displaying sequence (S76).

If the display pattern has not completed (S74: NO), the advertisement display unit 40 increases the number of "i" by one (step S75).

Then, the advertisement display unit 40 starts to shift to the i-th gazing region set in the display pattern (S77).

Then, the advertisement display unit 40 changes the angle of view after shifting to the i-th gazing region set in the display pattern, or changes the angle of view while shifting to the i-th gazing region set in the display pattern (S78).

Then, the sequence returns to step S72, and displays the gazing regions with the angle of view set in the display pattern based on the displaying sequence.

Repeat of Display Pattern

The full-view spherical image 6 displayed on the advertisement frame 7 using the terminal apparatus 30 rotates while automatically shifting the gazing regions A as described above. However, if the full-view spherical image 6 is being repeatedly displayed using a display pattern not clicked, the clicking rate can be improved by displaying the full-view spherical image 6 using another display pattern. Accordingly, the terminal apparatus 30 changes the display pattern of the same full-view spherical image 6 as below.

Figure 20:
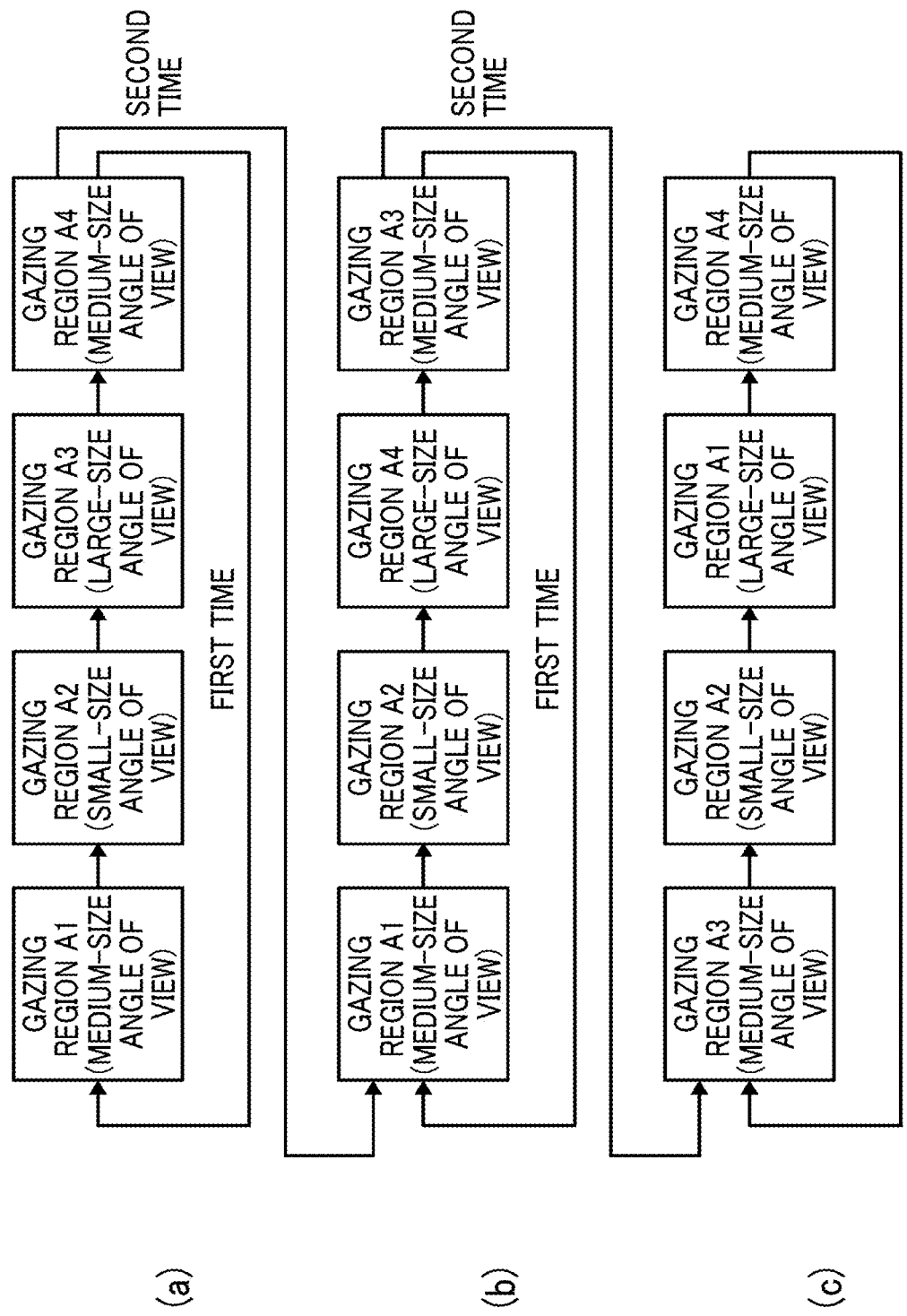
FIG. 20 (FIGS. 20(a), 20(b) and 20(c)) are example diagrams illustrating a switching of display patterns, according to an embodiment of the present disclosure.

FIG. 20(a) illustrates an example of a display pattern of the first time. FIG. 20(b) illustrates an example of a display pattern of the second time. FIG. 20(c) illustrates an example of a display pattern of the third time. The image distribution apparatus 10 transmits a plurality of display patterns to the terminal apparatus 30. For example, the advertisement display unit 40 repeats one display pattern two times, and then displays the image using another display pattern after repeating the one display pattern for two times.

A) First, the display pattern of the first time is repeated for two times.

B) Then, after the last gazing region A4 of the display pattern of the first time, the gazing region A shifts to the first gazing region A1 set in the display pattern of the second time.

C) Then, the display pattern of the second time is repeated for two times.

D) After the last gazing region A3 of the display pattern of the second time, the gazing region A shifts to the first gazing region A3 of the display pattern of the third time. Since there is no need to shift from the gazing region A3 to the gazing region A3, the display pattern of the third time can be started without shifting the gazing region A.

If the last gazing region A of one display pattern is the same as the first gazing region A of the next display pattern, the image display can be started from the second gazing region A of the next display pattern by assuming that the display of the first gazing region A of the next display pattern is completed.

When the full-view spherical image 6 is being displayed using the same display pattern for a given number of times or more, and then switching the display pattern, the clicking rate can be enhanced. The given number of times for switching the display pattern is, for example, two times, and the given number of times for switching the display pattern can be set with any number. For example, the terminal apparatus 30 can determine the given number of times for switching the display pattern based on the display time of one display pattern.

Further, the operation history recording unit 41 of the terminal apparatus 30 transmits the pattern ID of the display pattern that was adopted when the clicking operation was performed to the image distribution apparatus 10.

Figure 21:
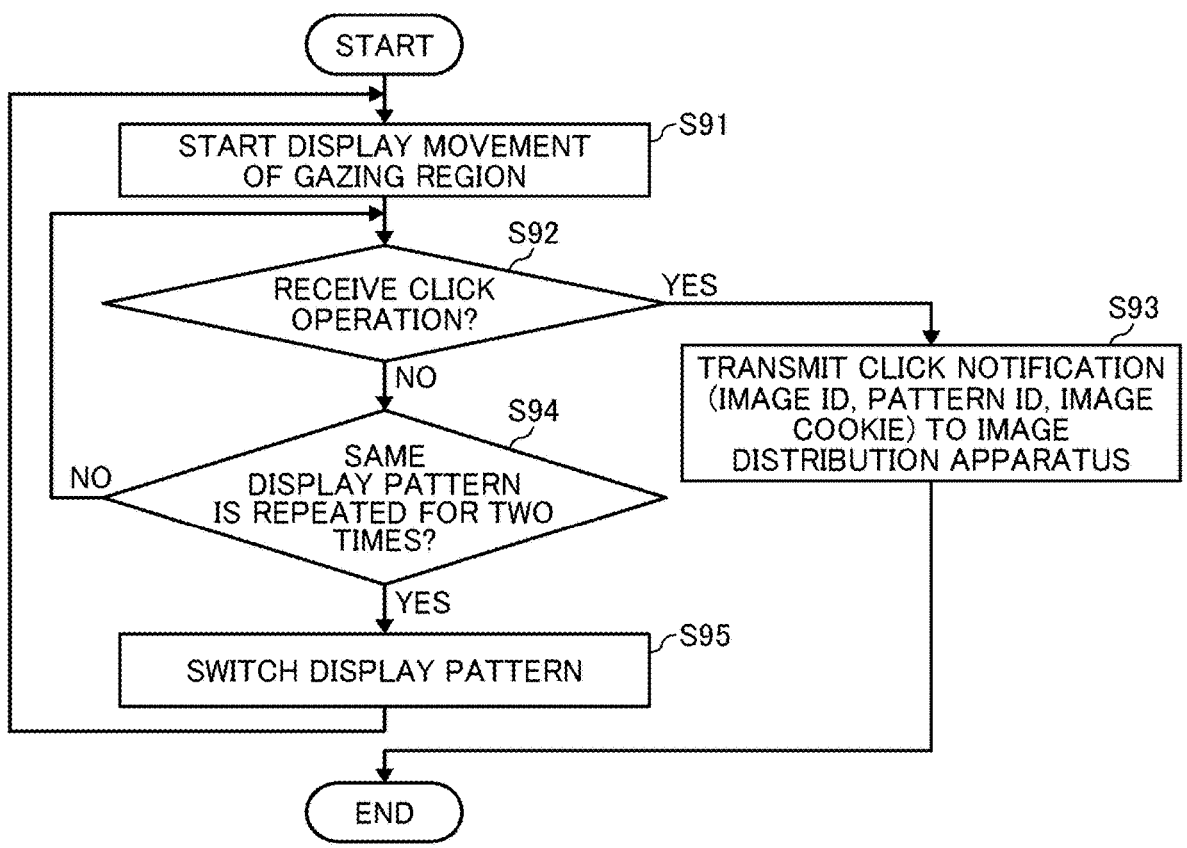
FIG. 21 is an example flowchart illustrating the steps of switching display patterns using a terminal apparatus, according to an embodiment of the present disclosure.

FIG. 21 is an example of a flowchart illustrating the steps of switching display patterns using the terminal apparatus 30.

After the advertisement display unit 40 of the terminal apparatus 30 receives advertisement data, the advertisement display unit 40 displays the full-view spherical image 6 while starting the display shifting of the gazing region A (S91).

Then, the operation history recording unit 41 determines whether the operation reception unit 34 has received a clicking operation (S92).

If the determination in step S92 is "YES," the operation history recording unit 41 transmits a notification of the clicking operation (including image ID, pattern ID, image cookie) to the image distribution apparatus 10 (S93).

If the determination in step S92 is "NO," the advertisement display unit 40 determines whether the same display pattern is repeated for a given number of times, such as two times (S94).

If the determination in step S94 is "NO," steps S92 and S93 are repeated.

If the determination in step S94 is "YES," the advertisement display unit 40 switches the display pattern (S95). Then, the sequence proceeds to step S91, and the rotation of the full-view spherical image 6 is started using the next display pattern. Switching of Display Pattern when Distributing Same Image to Same Viewer Person:

A viewer person who has registered the image cookie in the distribution history DB 191 saw the full-view spherical image 6 using any display pattern. When this viewer person browses a web page of the partner site web server 60 or a web page of another web server, the image distribution apparatus 10 may distribute the full-view spherical image 6. In this case, by changing the display pattern, the image distribution apparatus 10 can improve the clicking rate. If the terminal apparatus 30 repeatedly displays the full-view spherical image 6 while switching the display patterns as described in FIGS. 20 and 21, at least the first-time display pattern is switched to another display pattern.

Figure 22:
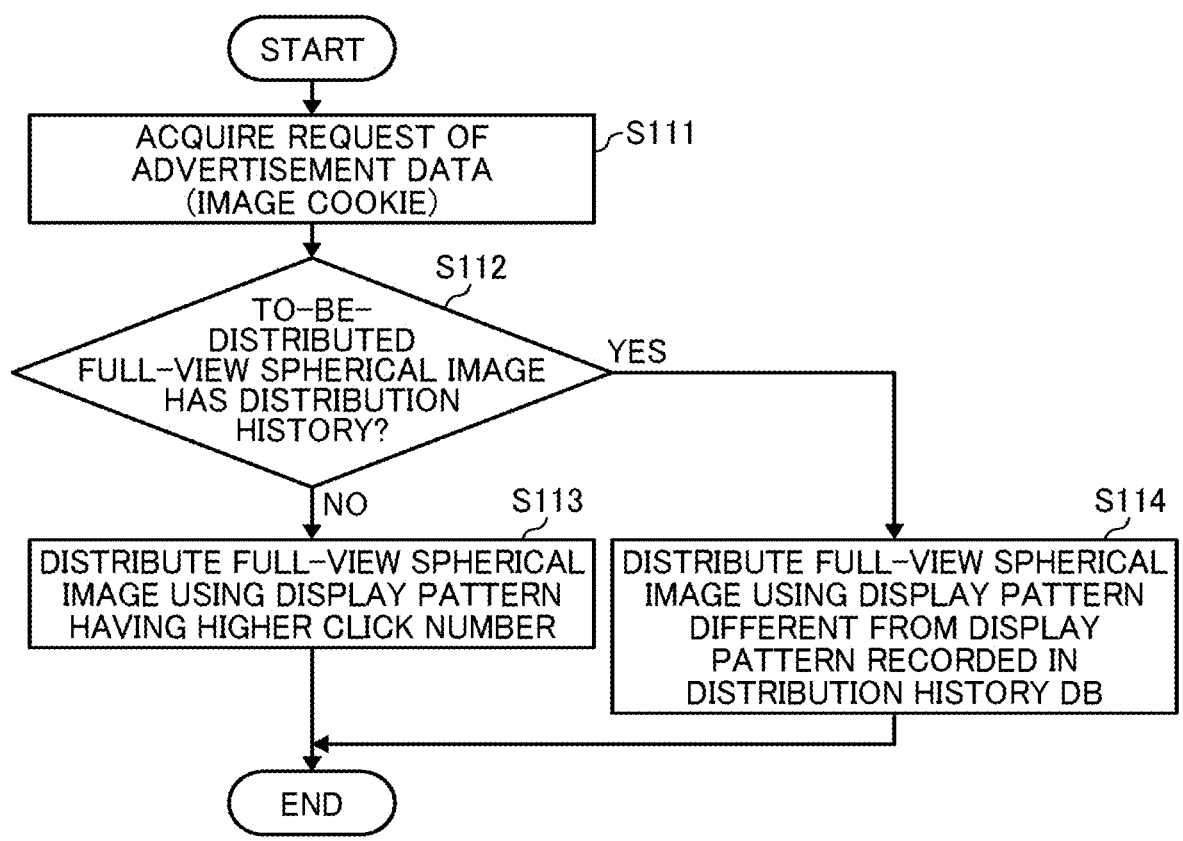
FIG. 22 is an example flowchart illustrating the steps of reducing distribution of a full-view spherical image using the same display pattern, which is performed using an advertisement distribution unit of an image distribution apparatus, according to an embodiment of the present disclosure.

FIG. 22 is an example of a flowchart illustrating the steps of reducing the distribution of the full-view spherical image 6 using the same display pattern, which is performed using the advertisement distribution unit 12 of the image distribution apparatus 10.

At first, the advertisement distribution unit 12 acquires a request of advertisement data together with the image cookie (S111). If the terminal apparatus 30 received the distribution of full-view spherical image 6 in the past, the image cookie is stored, and thereby the image distribution apparatus 10 can determine the viewer person.

The advertisement distribution unit 12 determines whether the to-be-distributed full-view spherical image 6 has a distribution history by referring to the distribution history DB 191 (S112). That is, the advertisement distribution unit 12 determines whether there is a distribution history that has distributed the full-view spherical image 6, that is determined as the to-be-distributed image in accordance with the attribute, to the same viewer person.

If the determination in step S112 is "NO," the advertisement distribution unit 12 distributes the full-view spherical image 6 using a display pattern having a higher click number as described above (S113).

If the determination in step S112 is "YES," the advertisement distribution unit 12 distributes the full-view spherical image 6 using a display pattern different from the display pattern recorded in the distribution history DB 191 (S114). For example, the advertisement distribution unit 12 distributes the full-view spherical image 6 using a display pattern having the highest number of times of clicking operation, different from the display patterns recorded in the distribution history DB 191.

In a case of the retargeting advertising, the full-view spherical image 6 recorded in the distribution history DB 191 is distributed. In this case too, the image distribution apparatus 10 can distribute the same full-view spherical image 6 using a display pattern different from the display pattern recorded in the distribution history DB 191, in which the image distribution apparatus 10 can be distributed with a different display pattern. Further, in the case of retargeting (or behavioral retargeting) advertising, the same display pattern can be used intentionally for the distribution.

Distribution of Movie Image

In some cases, the full-view spherical image 6 of movie image may be distributed. The movie image includes image frames set with different imaging time. In a case of movie image, an image capture position may be shifted little or may be shifted greatly. If the image capture position does not shift, the position of the gazing region A is not shifted, in which the movie image becomes similar to the still image.

Figure 23:
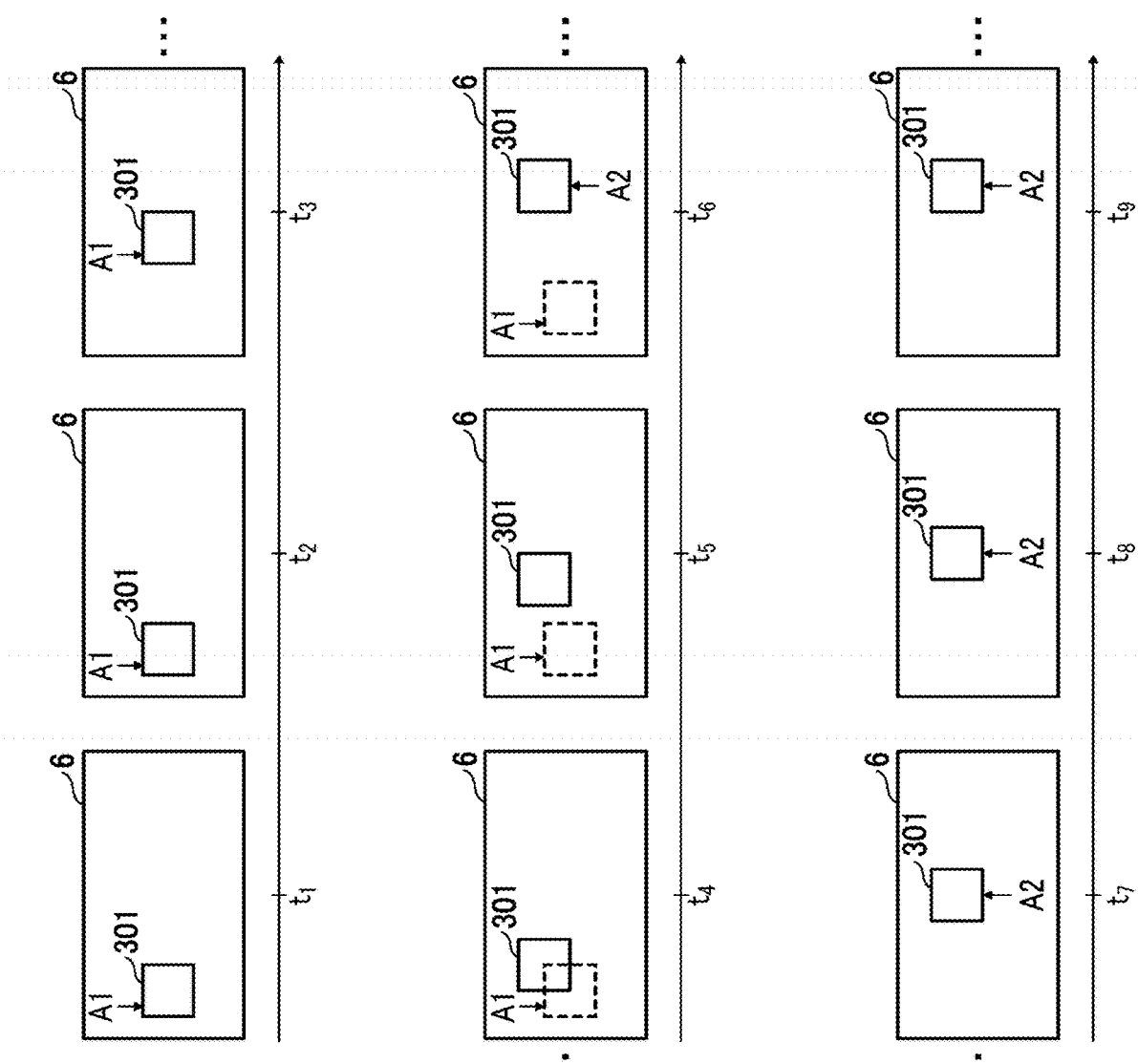
FIGS. 23A, 23B, and 23C (FIG. 23) are example diagrams illustrating a change of coordinates for a movie image when an image capture position shifts little, according to an embodiment of the present disclosure.

FIG. 23 illustrates examples of diagrams illustrating a change of coordinates for a movie image when the image capture position shifts little. FIG. 23A illustrates a case that a display region 301 is being still at the gazing region A1. Since the movie image is used, the frames are switched when the time elapses, but the gazing region A1 does not move. That is, the display region 301 displayed by the terminal apparatus 30 does not shift through time t1 to t3 along the time line.

FIG. 23B illustrates a case that the display region 301 shifts from the gazing region A1 to the gazing region A2. The display region 301 shifts from the gazing region A1 to the gazing region A2 while switching the frames, but the gazing region A does not move, and thereby the display region 301 can be shifted same as the still image.

FIG. 23C illustrates a case that the display region 301 is being still at the gazing region A2. Since the movie image is used, the frames are switched when the time elapses, but the gazing region A2 does not move. That is, the display region 301 displayed by the terminal apparatus 30 does not move through time t7 to t9 along the time line.

On the other hand, in a case of the movie image that the image capture positions move along the time line, the gazing target determination unit 13 detects the gazing region A, tracks the same gazing region A among the frames, and labels the gazing region A at each frame. During the still time period, the coordinate and angle of view are adjusted at each frame so that the same gazing region A is displayed. When the coordinates move, the coordinates can be interpolated same as the still image. Since the movie image is used, the gazing region A may disappear during the playing of image. In this case, the gazing region A shifts to the next gazing region before disappearing. Accordingly, the gazing target determination unit 13 tracks the gazing region A, and manages the presence or absence of the gazing region A in the time period, with which a display pattern that sequentially displays the gazing regions A can be generated.

As described above, the browsing system 100 of the embodiment can distribute a partial image or movie images having a higher image quality for the region specified in the gazing region A while reducing the increase volume of advertisement data and reducing the degradation of the effect of the advertisement. Alternatively, the effect of the advertisement can be improved. For example, when the compression ratio of the partial image is increased or the resolution is increased, a clear image can be obtained even if the distance is extended to some extent, for example, by the user in Tokyo Tower. This makes it easier for users to click on the advertisement. Further, when the partial image of the movie image is distributed, it becomes easy to click the advertisement because the interest is attracted by the motion even if the image quality is lowered.

Although the present invention has been described with reference to a preferred embodiment, the present invention is not limited to such embodiment, but various modifications and substitutions can be performed within the scope of the present invention For example, in the above described embodiment, the full-view spherical image 6 is displayed on the advertisement frame 7, but the full-view spherical image 6 may not be displayed as the advertisement. For example, the full-view spherical image 6 displayed on a web page provided directly by the advertiser web server 70 can be rotated to track the gazing regions A one to another.

Further, the application of the terminal apparatus 30 used for displaying the full-view spherical image 6 is not limited to the browser 8, but any application software can be used to rotate the displayed full-view spherical image 6 by shifting the gazing regions A.

In the above described embodiment, the full-view spherical image 6 is used for the advertisement, but it is not necessary to use the full-view spherical image 6 as the advertisement.

Further, as described in FIG. 13, in the above described embodiment, the terminal apparatus 30 accesses the DSP 20, and then accesses the image distribution apparatus 10 to acquire the advertisement data. However, the DSP 20 may be configured to acquire the advertisement data directly from the image distribution apparatus 10 and then transmit the advertisement data to the terminal apparatus 30. In this case, since the terminal apparatus 30 can acquire the advertisement data by accessing the DSP 20 alone, the time until the advertisement is displayed can be shortened.

Further, when the full-view spherical image 6 being displayed using one display pattern is clicked, the display region and the browsing angle at the time of clicking can be used as one piece of the operation history information to be used for determining the gazing region A.

Further, the DSP 20 and the image distribution apparatus 10 can be integrated, in which the DSP 20 distributes the advertisement data (e.g., full-view spherical image 6) to the terminal apparatus 30.

Further, the advertisement distribution unit 12 can be configured to evaluate each display pattern using at least one of the clicking rate and the number of times of clicking operation performed for each display pattern. Further, the advertisement distribution unit 12 can evaluate each display pattern using an evaluation index, such as the number of times of pressing a "good" button for each display pattern.

Further, the method of distributing the advertisement using the cooperation of the SSP 50, DSP 20, and image distribution apparatus 10 described in the above described embodiment is just one example, and there is no intention to limit the processing of displaying the advertisement using the terminal apparatus 30. For example, as a simple processing, the partner site web server 60 may store advertisement data provided from an advertiser, and distribute the advertisement data to the terminal apparatus 30. In this case, the SSP 50, the DSP 20, and the image distribution apparatus 10 may be omitted.

Further, in the above described embodiment, the full-view spherical image 6 capturing 360 degrees of the circumference of the full-view spherical camera is set on a web page, but not limited thereto. The image data of the web page can be a wide-angle image. The wide-angle image in the above described embodiment indicates an image having a portion that cannot be displayed on the advertisement frame. For example, a panoramic image having an angle of view of about 180 degrees in the horizontal direction may be used as the wide-angle image.

Further, in the above described embodiment, the full-field view spherical image is generated by combining two images, but not limited thereto. For example, the full-field view spherical image can be generated by overlapping portions of image data, which are captured by slightly shifting the image capturing directions. That is, the method of generating the full-length view spherical image is not limited to any specific method.

Further, in the above described embodiment, for the convenience of description, the display region that is set by cutting a part within the full-view spherical image 6 is described, but by setting an angle of view covering the full-view spherical image 6, the terminal apparatus 30 can display the full-view spherical image entirely (sphere). The display pattern may cover a part or all of the gazing regions A set with the angle of view, and the display pattern may be configured to cover all of the full-view spherical image 6.

Further, the configuration of FIG. 9 illustrated in the above embodiment is divided according to the main function to facilitate understanding of the processing of the browsing system 100. However, the configuration of dividing various functions and names of processing units is not limited to the above example configuration. The browsing system 100 can be further divided into more processing units in accordance with the processing contents. Further, the browsing system 100 can be divided by including more processes in one processing unit.

In the above described embodiment, the pattern DB 195 is an example of the display method storage unit, the advertisement distribution unit 12 is an example of the wide-angle image transmission unit, the advertisement acquiring unit 39 is an example of the wide-angle image acquiring unit, the advertisement display unit 40 is an example of the wide-angle image display unit, the operation reception unit 34 is an example of the operation reception unit, the operation history transmitting unit 42 is an example of the operation history transmission unit, and the operation history acquiring unit 14 is an example of the operation history acquiring unit. In this description, the gazing region Ai (i: natural number of 1 to n) is an example of a first display region, and the gazing region Ai+1 is an example of a second display region, different from the gazing region Ai. In this description, the terminal apparatus 30 is an example of a first information processing apparatus or a second information processing apparatus.

Hereinafter, a description is given of an example case using the above described browsing system 100 with reference to FIGS. 24 to 27, in which the full-view spherical image 6 of an object including a scene of the object in some cases, generated from image data of the object captured by the image capture device, and an image of 3DCG data generated from the 3DCG data are used. As indicated in FIGS. 24 to 26, when the full-view spherical image 6 of the object, such as an interior of a jewelry shop, is captured as a captured image, a specific region image corresponding to a specific region within the full-view spherical image 6 can be generated as a background image, and an image of 3DCG data (hereinafter, 3DCG image) of a ring (an example of target) superimposable over the background image as a superimposed image are displayed on the display.

Figure 24:
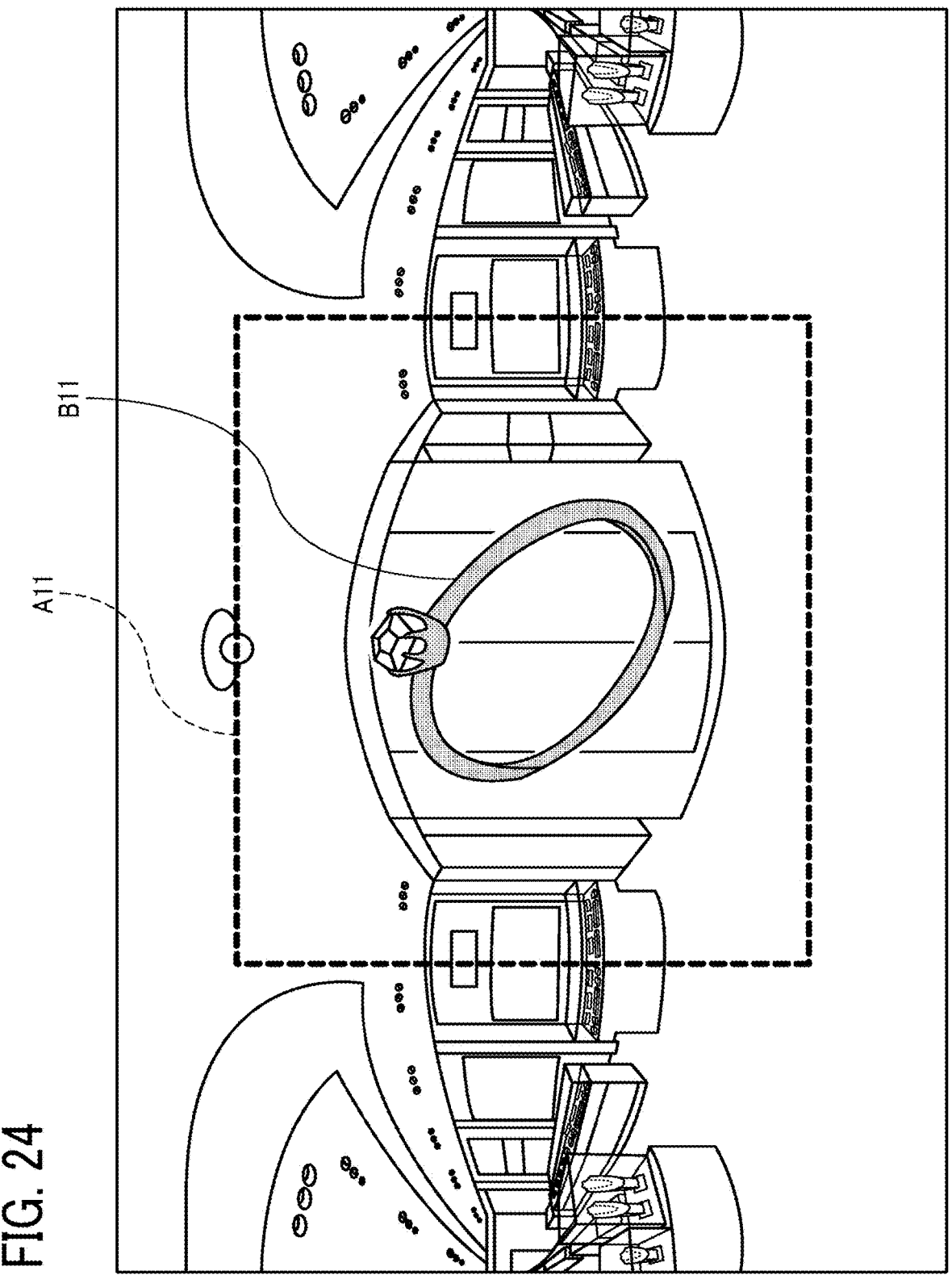
FIG. 24 illustrates an example of a screen displaying three-dimensional computer graphics (3DCG) image of a ring as a superimposed image over a background image of a jewelry shop, according to an embodiment of the present disclosure.
Figure 25:
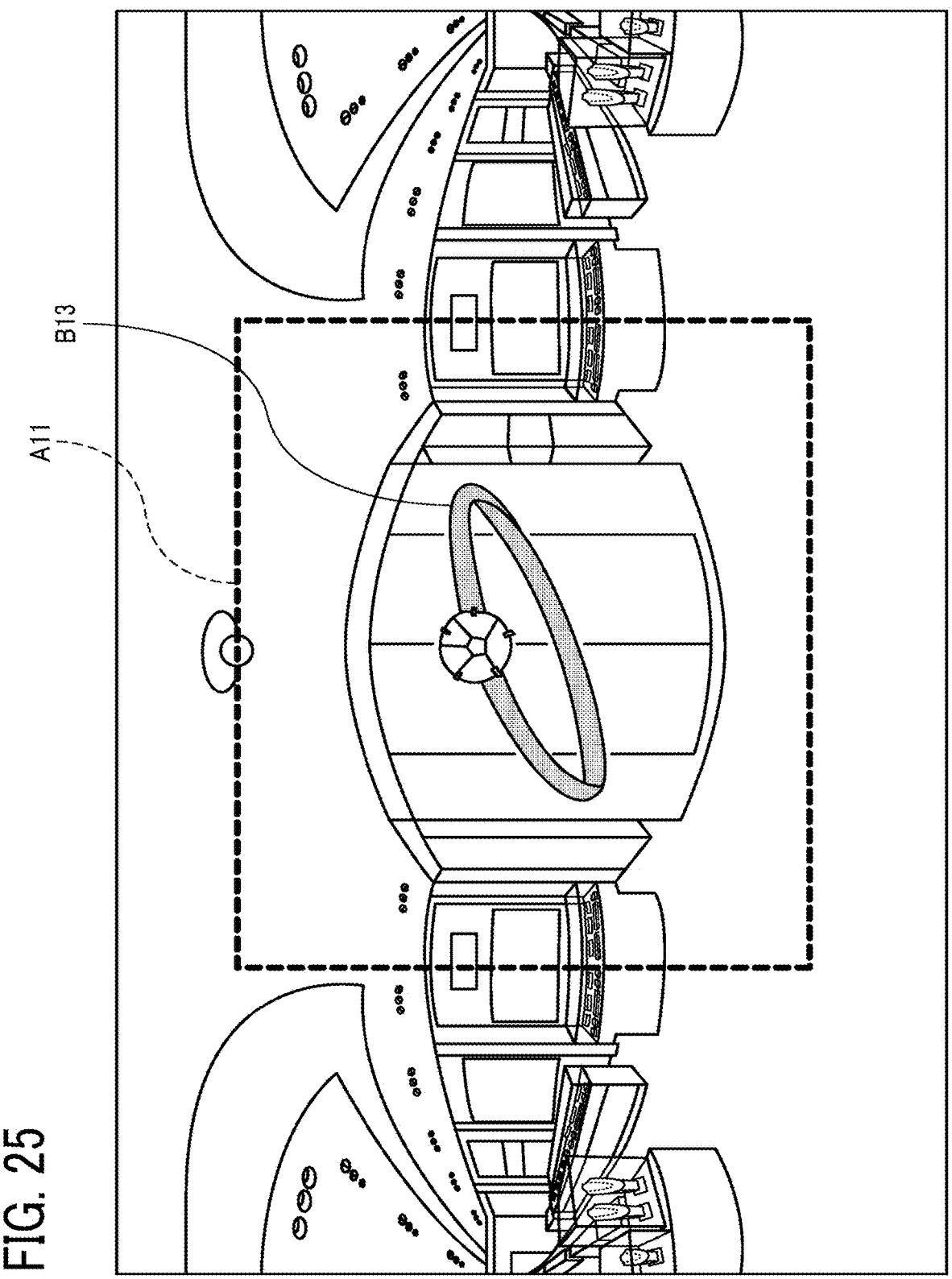
FIG. 25 illustrates another example of a screen displaying 3DCG image of a ring as a superimposed image over a background image of a jewelry shop, according to an embodiment of the present disclosure.
Figure 26:
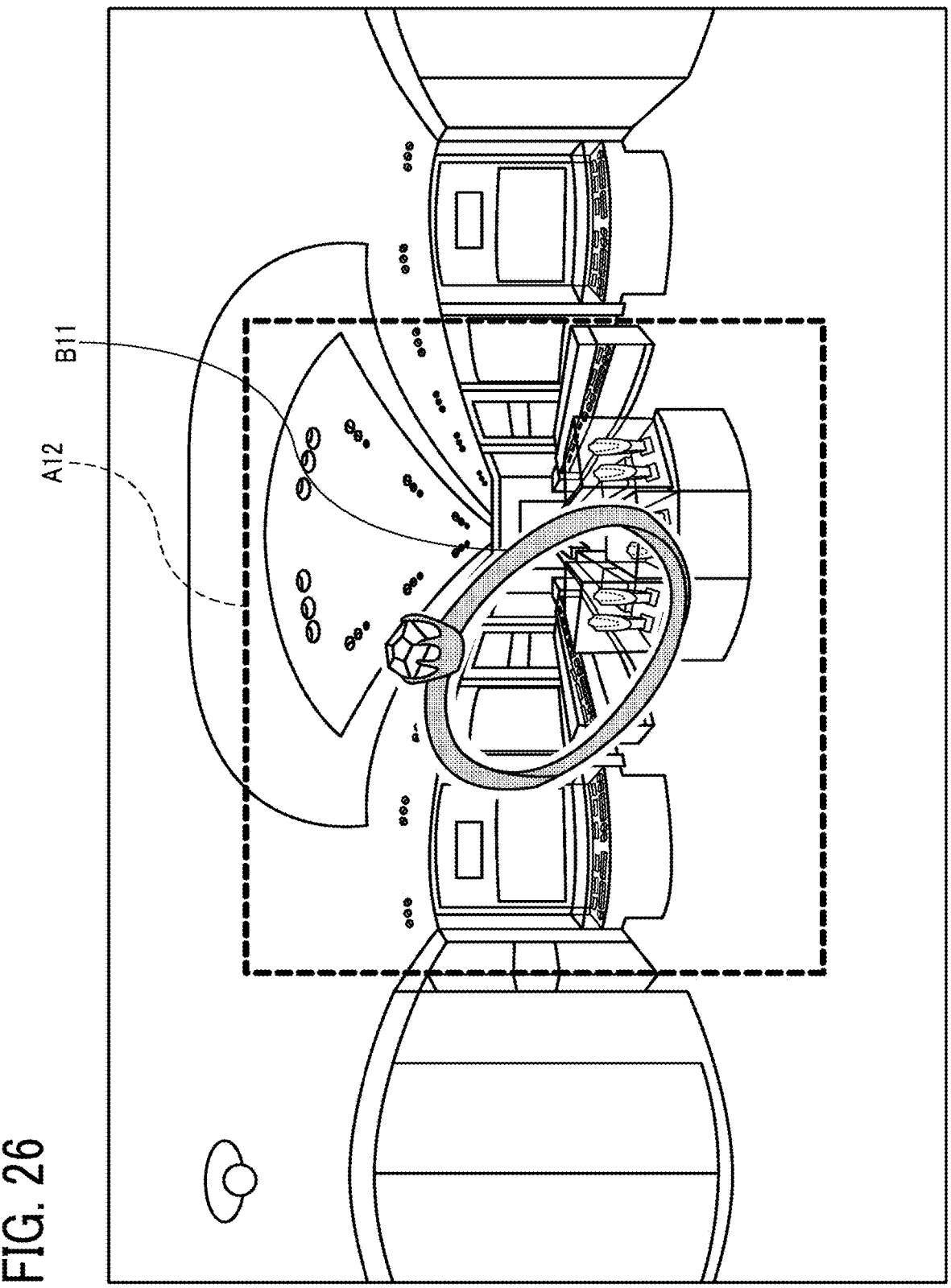
FIG. 26 illustrates another example of a screen displaying 3DCG image of a ring as a superimposed image over a background image of a jewelry shop, according to an embodiment of the present disclosure.
Figure 27A:
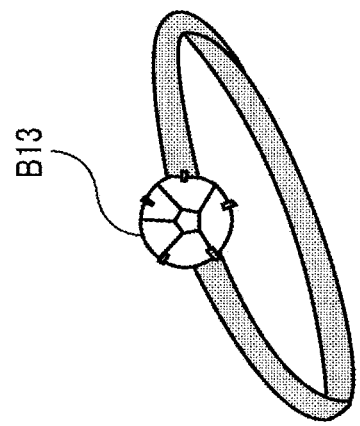
FIGS. 27A, 27B and 27C (FIG. 27) illustrate examples of 3DCG image of a ring viewed from different viewpoints, according to an embodiment of the present disclosure.
Figure 27B:
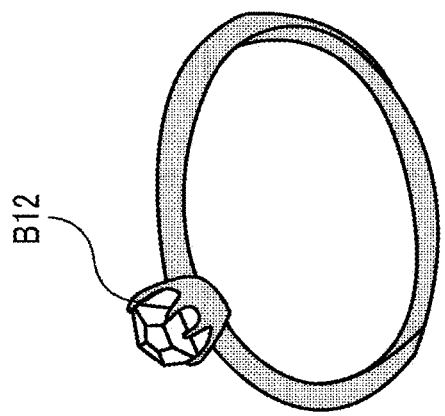
Figure 27C:
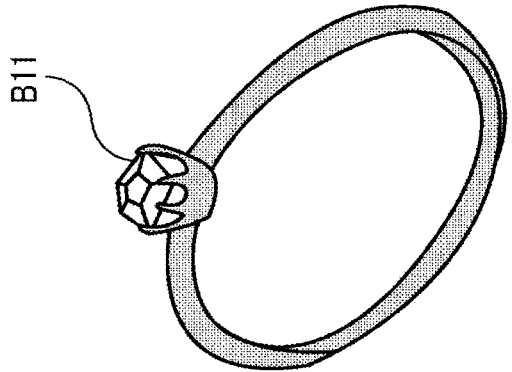

FIGS. 24 to 26 illustrate examples of screens displaying the 3DCG image of the ring as the superimposed image, which is superimposed over the background image representing the interior of the jewelry shop. FIGS. 27A, 27B and 27C (FIG. 27) illustrate examples of the 3DCG image of the ring viewed from different viewpoints.

In FIG. 24, while displaying a specific region image representing a gazing region A11 (specific region) within the full-view spherical image, which is the interior of the jewelry shop, as the background image, the 3DCG image of the ring "B11" is superimposed and displayed over the specific region image (i.e., gazing region A11).

Further, in FIG. 25, while displaying the specific region image, same as the specific region image in FIG. 24, as the background image, the 3DCG image of the ring "B13" that has changed the gazing direction is superimposed and displayed over the specific region image (i.e., gazing region A11).

Further, in FIG. 26, while the gazing direction of the 3DCG image of the ring is returned to the 3DCG image of the ring "B11" in FIG. 24, a specific region image, which has changed the gazing region from the gazing region A11 to the gazing region A12, is displayed as the background image.

In such a case, the specific region image is displayed by successively shifting the specific regions from the specific region A11 and to the specific region A12, different from the specific region A11, to gradually approach the specific region A12. Further, as illustrated in FIG. 27, the 3DCG image of the ring can be successively rotated (shifted) from the gazing direction B11 to the gazing direction B12 to gradually approach the gazing direction B12 and then successively rotated (shifted) to gradually approach the gazing direction B13.

As to the above described embodiment, the browsing system can distribute images that can easily attract the interest of viewer persons.

In the above described embodiment, the image captured by the full-view spherical imaging camera is used, but not limited thereto. For example, another image such as two-dimensional computer graphics (2DCG) can be used. Further, the image capture device that captures images of object is not limited to the full-view spherical imaging camera, but can be any imaging camera depending on application fields of the above described embodiment.

The functions of each of the embodiments can be implemented by computer executable programs such as programs described in legacy programming languages and object oriented programming languages such as Assembler, C++, C++, Java (registered trademark) and the like, and stored on a computer-readable recording medium such as ROM, electrically erasable programmable read-only memory (EEPROM), erasable programmable read-only memory (EPROM), flash memory, flexible disk, CD-ROM, compact disc-rewritable (CD-RW), digital versatile disc (DVD)-ROM, DVD-RAM, DVD-RW, Blu-ray disc, secure digital (SD) card, magneto-optical disc (MO), or the like, and the computer executable program is distributable via telecommunication lines. Any one of the above-described operations may be performed in various other ways, for example, in an order different from the one described above.

Numerous additional modifications and variations are possible in light of the above teachings. It is therefore to be understood that, within the scope of the appended claims, the disclosure of this patent specification can be practiced otherwise than as specifically described herein.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. A terminal apparatus, comprising:
   circuitry configured to
      receive image data corresponding to an image of an object, three-dimensional computer graphics (3DCG) data, and data of an angle of view defining a specific region within the image of the object, the specific region being only a portion of the image of the object; and
      display, on a display, a specific region image corresponding to the specific region defined by the received angle of view as a background image, and an image of the 3DCG data as a superimposed image superimposed on the background image, the specific region image being generated from the image data of the object and the data of the angle of view, and the image of the 3DCG data being generated from the 3DCG data.

2. The terminal apparatus according to claim 1,
   wherein the circuitry is further configured to receive gazing target displaying sequence information defining a displaying sequence of a plurality of gazing directions of the image of the 3DCG data, and
   wherein the circuitry is further configured to display the image of the 3DCG data while changing a gazing direction of the image of the 3DCG data based on the displaying sequence defined by the gazing target displaying sequence information.

3. The terminal apparatus according to claim 2,
   wherein the circuitry is further configured to display the image of the 3DCG data while sequentially changing a display pattern of the image of the 3DCG data according to the gazing direction of the image of the 3DCG data that changes from a first gazing direction to a second gazing direction of the plurality of gazing directions, based on the displaying sequence defined by the gazing target displaying sequence information, the second gazing direction being different from the first gazing direction.

4. The terminal apparatus according to claim 2,
   wherein the gazing target displaying sequence information includes operation history information recording a number of times of displaying each of the plurality of gazing directions of the image of the 3DCG data in a descending order.

5. The terminal apparatus according to claim 4,
   wherein the operation history information recording the number of times of displaying each of the plurality of gazing directions of the image of the 3DCG data in the descending order is generated from information of a clicking operation performed for each of the plurality of gazing directions.

6. The terminal apparatus according to claim 2,
   wherein the circuitry is further configured to receive a change of the gazing direction of the image of the 3DCG data, and
   wherein the circuitry is further configured to display the image of the 3DCG data in accordance with the changed gazing direction, instead of applying the displaying sequence defined by the gazing target displaying sequence information.

7. The terminal apparatus according to claim 1,
   wherein the circuitry is further configured to receive region displaying sequence information defining a displaying sequence of a plurality of specific region images, including the specific region image, for the image of the object, and
   wherein the circuitry is further configured to display the plurality of specific region images based on the displaying sequence defined by the region displaying sequence information.

8. The terminal apparatus according to claim 7,
   wherein the circuitry is further configured to display the plurality of specific region images while sequentially changing the specific regions from a first specific region to a second specific region, different from the first specific region, based on the displaying sequence defined by the region displaying sequence information.

9. The terminal apparatus according to claim 7,
   wherein the region displaying sequence information includes operation history information recording a number of times of displaying each of a plurality of specific regions in a descending order.

10. The terminal apparatus according to claim 9,
    wherein the operation history information recording the number of times of displaying each of the plurality of specific regions in the descending order is generated from information of a clicking operation performed for each of the plurality of specific regions.

11. The terminal apparatus according to claim 7,
    wherein the circuitry is further configured to receive a change of the specific region, and
    wherein the circuitry is further configured to display a specific region image in accordance with the changed specific region, instead of applying the displaying sequence defined by the region displaying sequence information.

12. The terminal apparatus according to claim 1,
    wherein the image data of the object is captured by an image capture device.

13. The terminal apparatus of claim 1,
    wherein the image data of the object and the 3DCG data are data of advertisement images.

14. The terminal apparatus of claim 1, wherein the image of the object is a spherical image and the specific region is defined by the angle of view when the spherical image is viewed from a viewpoint at a center of a sphere.

15. A system comprising:
    the terminal apparatus of claim 1; and
    an image distribution apparatus.

16. A method of displaying an image, the method comprising:
    receiving image data corresponding to an image of an object, three-dimensional computer graphics (3DCG) data, and data of an angle of view defining a specific region within the image of the object, the specific region being only a portion of the image of the object; and
    displaying, on a display, a specific region image corresponding to the specific region defined by the received angle of view as a background image, and an image of the 3DCG data as a superimposed image superimposed on the background image, the specific region image being generated from the image data of the object and the data of the angle of view, and the image of the 3DCG data being generated from the 3DCG data.

17. A terminal apparatus, comprising:
  circuitry configured to
    receive two-dimensional computer graphics (2DCG) data corresponding to an image, three-dimensional computer graphics (3DCG) data, and data of an angle of view defining a specific region within the image of the object, the specific region being only a portion of the image of the object; and
    display, on a display, a specific region image corresponding to the specific region defined by the received angle of view as a background image, and an image of the 3DCG data as a superimposed image superimposed on the background image, the specific region image being generated from the 2DCG data and the data of the angle of view, and the image of the 3DCG data being generated from the 3DCG data.

18. The terminal apparatus of claim 17, wherein the 2DCG data and the 3DCG data are transmitted from an image distribution apparatus and are advertisement images.

19. A non-transitory computer readable recording medium storing one or more instructions that, when executed by one or more processors, cause the one or more processors to perform the method of claim 16.

* * * * *